(12) United States Patent
Markushov et al.

(10) Patent No.: US 11,331,752 B2
(45) Date of Patent: May 17, 2022

(54) BACKSIDE SURFACE WELDING SYSTEM AND METHOD

(71) Applicant: IPG PHOTONICS CORPORATION, Oxford, MA (US)

(72) Inventors: Iurii Markushov, Shrewsbury, MA (US); Nikolay Grezev, Fryazino (RU); Maksim Murzakov, Worcester, MA (US)

(73) Assignee: IPG PHOTONICS CORPORATION, Oxford, MA (US)

( * ) Notice: Subject to any disclaimer, the term of this patent is extended or adjusted under 35 U.S.C. 154(b) by 322 days.

(21) Appl. No.: 16/557,027

(22) Filed: Aug. 30, 2019

(65) Prior Publication Data

US 2021/0060701 A1 Mar. 4, 2021

Related U.S. Application Data

(60) Provisional application No. 62/724,934, filed on Aug. 30, 2018.

(51) Int. Cl.
*B23K 26/242* (2014.01)
*B23K 26/082* (2014.01)
*B23K 26/57* (2014.01)
*B23K 26/06* (2014.01)
*B23K 26/12* (2014.01)
(Continued)

(52) U.S. Cl.
CPC ........ *B23K 26/242* (2015.10); *B23K 26/0643* (2013.01); *B23K 26/082* (2015.10); *B23K 26/123* (2013.01); *B23K 26/32* (2013.01); *B23K 26/57* (2015.10); *B23K 2103/14* (2018.08)

(58) Field of Classification Search
CPC .... B23K 26/242; B23K 26/123; B23K 26/57; B23K 26/082; B23K 26/32; B23K 26/0643; B23K 2103/14
USPC .......................... 219/121.63, 121.64, 121.85
See application file for complete search history.

(56) References Cited

U.S. PATENT DOCUMENTS 5,483,034 A * 1/1996 Havard .............. B23K 26/0604
219/121.64
2003/0183606 A1* 10/2003 Lundgren ............... F02K 9/972
219/121.63
2006/0255019 A1 11/2006 Martukanitz
(Continued)

FOREIGN PATENT DOCUMENTS

DE 10 2007 038502 B4 1/2013
JP 2004148334 A * 10/2002
(Continued)

*Primary Examiner* — Thien S Tran
(74) *Attorney, Agent, or Firm* — Caroline J. Roush, Esq.

(57) ABSTRACT

Laser welding of a first metal substrate having a first planar surface and a second planar surface disposed opposite the first planar surface to a second metal substrate is performed by placing an end face of the second metal substrate proximate to the first planar surface. An input laser beam from a fiber laser is generated, and a beam delivery system is provided that is configured to receive the input laser beam and generate an output laser beam having a beam spot that moves in a predetermined pattern along a first and a second axes to irradiate a target area on the second planar surface such that the target area is positioned over an intersection region of the first planar surface where the end face is positioned proximate to the first planar surface.

16 Claims, 21 Drawing Sheets

(51) Int. Cl.
 *B23K 26/32* (2014.01)
 *B23K 103/14* (2006.01)

(56) References Cited

U.S. PATENT DOCUMENTS

| | | | |
|---|---|---|---|
| 2010/0116792 A1* | 5/2010 | Boman | B23K 26/064 |
| | | | 219/121.13 |
| 2016/0368089 A1 | 12/2016 | Grapov et al. | |
| 2018/0009060 A1* | 1/2018 | Yang | B23K 26/244 |
| 2018/0126491 A1* | 5/2018 | Nakagawa | B23K 26/354 |

FOREIGN PATENT DOCUMENTS

| | | | |
|---|---|---|---|
| JP | 6596655 B2 * | 10/2019 | |
| WO | WO 2015/104762 A1 | 7/2015 | |

* cited by examiner

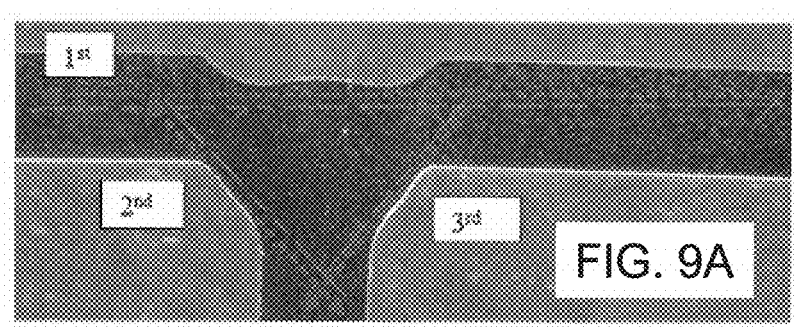
FIG. 9A
FIG. 9B
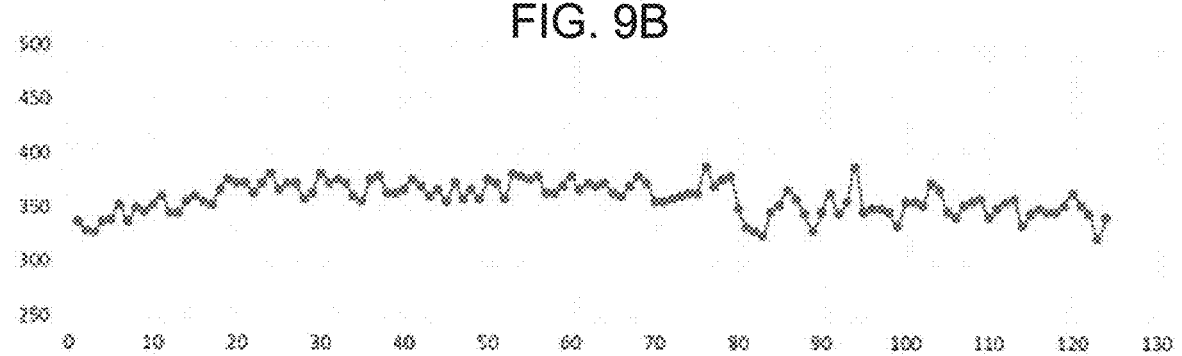
Measure microhardness from 1st line
FIG. 9C
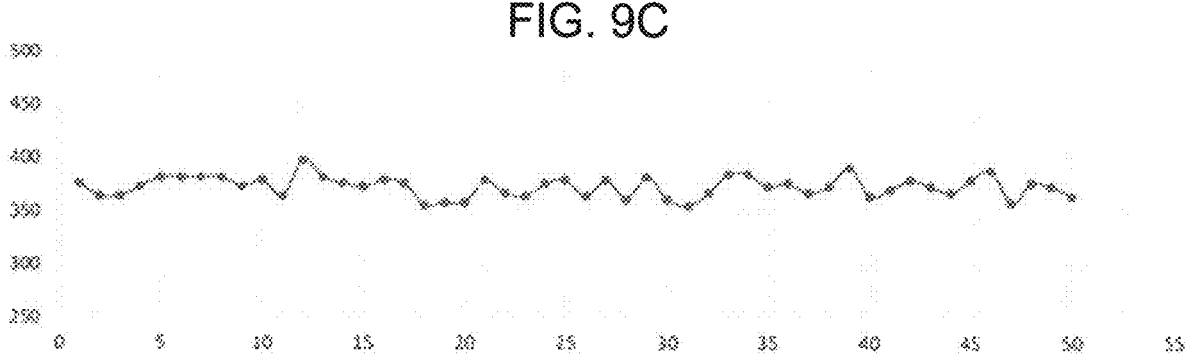
Measure microhardness from 2nd line
FIG. 9D
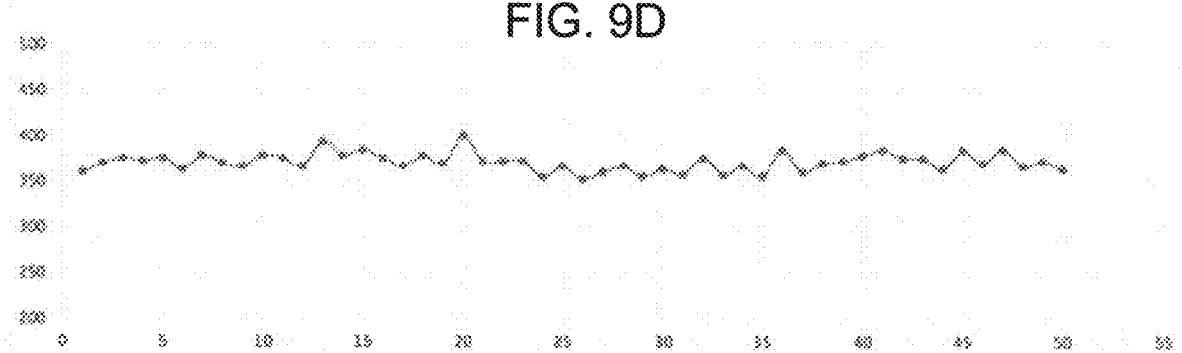
Measure microhardness from 3rd line BM – Base Metal
HAZ – Heat Affected Zone
FZ – Fusion Zone
(X5) – Scale magnification

Fig 1. Weld# F1
Offset = 0 mm
Fig 2. Weld# F1
Offset = 0.3 mm
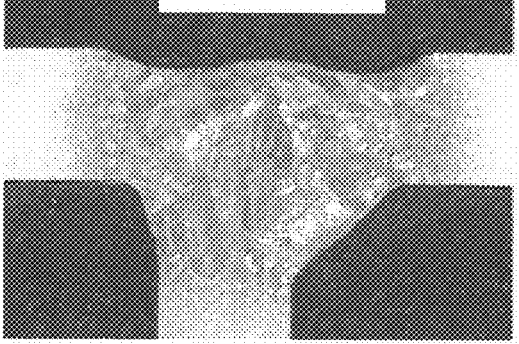
Fig 3. Weld# F1
Offset = 0.5 mm
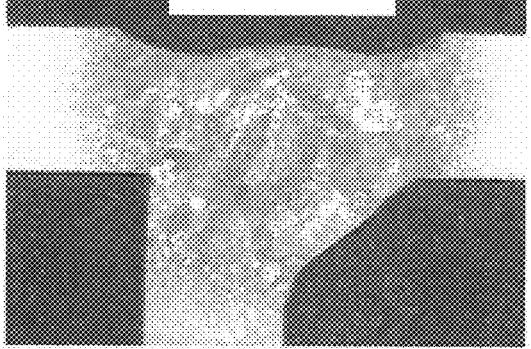
Fig 4. Weld# F1
Offset = 0.7 mm

BACKSIDE SURFACE WELDING SYSTEM AND METHOD

CROSS-REFERENCE TO RELATED APPLICATIONS

This patent application claims priority to Provisional Patent Application No. 62/724,934 titled "BACKSIDE SURFACE WELDING SYSTEM AND METHOD" filed Aug. 30, 2018, which is incorporated by reference herein in its entirety.

BACKGROUND

Technical Field

The technical field relates generally to laser welding, and more specifically to backside surface welding of two metal substrates.

Background Discussion

Metals and metal alloys are used in a variety of industries, including marine, defense, automotive, railroad, transportation, mining, drilling, aerospace, manufacturing, and medical industries. Common to all of these industries is the need to weld parts together with fusion based or solid-state based welding processes. Examples of welding processes include gas tungsten arc welding (GTAW), shielded metal arc welding (SMAW), gas metal arc welding (GMAW), plasma arc welding (PAW), plasma welding (PW), electron beam welding (EBW), and laser beam welding (LBW), to name a few.

Certain applications present different challenges to different welding processes. For example, titanium (Ti) alloys used in the aerospace industry are conventionally welded using EBW and GTAW processes. While possible to achieve deep penetration and "blind" welding, the use of EBW with these substrates presents several problems, including long processing times and high costs, slow cooling rates (due to the lack of atmosphere and convection-type cooling), as well as a limited ability to access complex joints with the e-beam gun and the limited size of the workpiece due to the requirement of a vacuum chamber. Due to the small spot size of the e-beam, the costs associated with preparation of the joint and the required tooling are also higher since the workpiece has to be resized with a smaller joint gap. GTAW is a low power density process which results in long processing times, and includes very high heat inputs that result in welds that exhibit poor microstructure and are susceptible to welding distortion. LBW, like EBW, is a high power density process that can achieve deep penetration welds at higher speeds and low distortion, although laser welding of thicker and larger structures typically results in welds that are porous and exhibit contamination.

SUMMARY

Aspects and embodiments are directed to a method and system for laser welding metal substrates to one another by applying laser energy to a backside surface of a top plate that forms one of the metal substrates.

According to one embodiment, a method for laser welding a first metal substrate to a second metal substrate is provided. The first metal substrate has a first planar surface and a second planar surface disposed opposite the first planar surface, and the method includes selecting first and second metal substrates having a thickness, surface tension and thermal characteristics suitable for controlled flow thereof when in a molten state, placing an end face of the second metal substrate proximate to the first planar surface, generating an input laser beam from a fiber laser, providing a beam delivery system configured to receive the input laser beam and to generate an output laser beam having a beam spot that moves in a predetermined pattern along a first and a second axes, and passing the input laser beam through the beam delivery system to irradiate a target area on the second planar surface of the first metal substrate with the beam spot, the target area positioned over an intersection region of the first planar surface where the end face is positioned proximate to the first planar surface.

According to one embodiment, the beam delivery system is configured to generate a defocused output laser beam.

According to another embodiment, irradiating creates a dual fillet weld such that a fillet weld is formed in each corner area between the first and second metal substrates. In another embodiment, each fillet weld has a weld face with a smooth profile.

In another embodiment, irradiating creates a weld region that extends through a thickness of the first metal substrate and a thickness of the second metal substrate. According to another embodiment, a cross section of the weld region has a uniform hardness. In another embodiment, the weld region has a small grain size. In some embodiments the weld region has a low porosity. In some embodiments, a cross section of the weld region has at least one of a uniform hardness, small grain size, and a low porosity.

According to one embodiment, placing the end face of the second metal substrate proximate to the first planar surface includes a gap between the end face and the first planar surface, the gap being a distance of up to about one quarter of the thickness of the first metal substrate.

According to another embodiment, the method further includes positioning the output laser beam to have an incident angle of up to 10 degrees from a reference line perpendicularly incident to the second planar surface.

In certain embodiments, the predetermined pattern is one of a circular pattern, a linear pattern, a figure-eight pattern, and an infinity pattern.

In another embodiment, the method includes directing a flow of inert shielding gas to the target area.

In another embodiment, the method includes aligning the predetermined pattern with the intersection region.

In another embodiment, the method includes directing the beam spot along a length of the first metal substrate.

In accordance with another embodiment, a system for laser welding a first metal substrate to a second metal substrate is provided. The first metal substrate has a first planar surface and a second planar surface disposed opposite the first planar surface, and the second metal substrate has an end face positioned proximate to the first planar surface, and the system includes a fiber laser energy source configured to generate an input laser beam, and a beam delivery system configured to: receive the input laser beam and to generate an output laser beam having a beam spot that moves in a predetermined pattern along a first and a second axes, and irradiate a target area on the second planar surface of the first metal substrate with the beam spot, the target area positioned over an intersection region of the first planar surface where the end face is positioned proximate to the first planar surface.

According to another embodiment, the system includes a controller configured to control the beam delivery system such that the predetermined pattern is aligned with the intersection region.

According to another embodiment, the beam delivery system is configured to generate a defocused output laser beam.

According to another embodiment, the fiber laser energy source and the beam delivery system are configured such that the irradiation of the target area forms a fillet weld in each corner area between the first and second metal substrates.

According to some embodiments, each fillet weld has a weld face with a smooth profile.

In some embodiments the irradiation of the target area creates a weld region that extends through a thickness of the first metal substrate and a thickness of the second metal substrate. In another embodiment, the weld region has at least one of uniform hardness, low porosity, and small grain structure.

In some embodiments, the support structure is configured to position the end face of the second metal substrate proximate to the first planar surface such that a gap of up to about one quarter of the thickness of the first metal substrate exists between the end face and the first planar surface.

In another embodiment, the beam delivery system is configured to direct the output laser beam at an incident angle of up to 10 degrees from a reference line perpendicularly incident to the second planar surface.

According to certain embodiments, the beam delivery system includes movable mirrors configured to generate the predetermined pattern along the first and second axes.

In some embodiments, the movable mirrors are configured to generate one of a circular pattern, a linear pattern, a figure-eight pattern, and an infinity pattern as the predetermined pattern.

According to certain embodiments, the first and second metal substrates are a titanium alloy.

In some embodiments, the method further includes a flow of inert shielding gas directed at the target area.

According to at least one embodiment, the first and second metal substrates have a thickness, surface tension and thermal characteristics suitable for controlled flow thereof when in a molten state.

Still other aspects, embodiments, and advantages of these example aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Embodiments disclosed herein may be combined with other embodiments, and references to "an embodiment," "an example," "some embodiments," "some examples," "an alternate embodiment," "various embodiments," "one embodiment," "at least one embodiment," "this and other embodiments," "certain embodiments," or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

FIGS. 9A-9D are hardness measurement results obtained from metal substrates welded according to aspects of the invention;

FIGS. 13A-13D are micrographs of a cross-section of two metal substrates formed with different process parameters in accordance with one or more aspects of the invention;

DETAILED DESCRIPTION

In welding fabrications, the "T" connection or T-joint is one type of welded connection used to join two pieces of metal together, in which a first piece of metal such as a stiffener workpiece forms the leg (also called the "web" or "rib") of the T and the second workpiece is the top of the T (also called the "flange" or "cover"). In certain instances, both corners of the T connection are welded with fillet welds, wherein these weld joints are referred to as "dual fillet" (or "double fillet") welds (and also referred to as a full penetration double fillet weld, in that the entire interface between the flange and web is consumed, in addition to the presence of both fillets). A common example of dual fillet welding is in the fabrication of girders, in which stiffeners are attached to the web of a girder with two long and straight fillet welds. Other examples include T connections on round fabrications, such as connections of stiffeners to a tube or pipe. Yet another example includes using a tube as the top of the T and a plate as the leg of the T.

Figure 1:
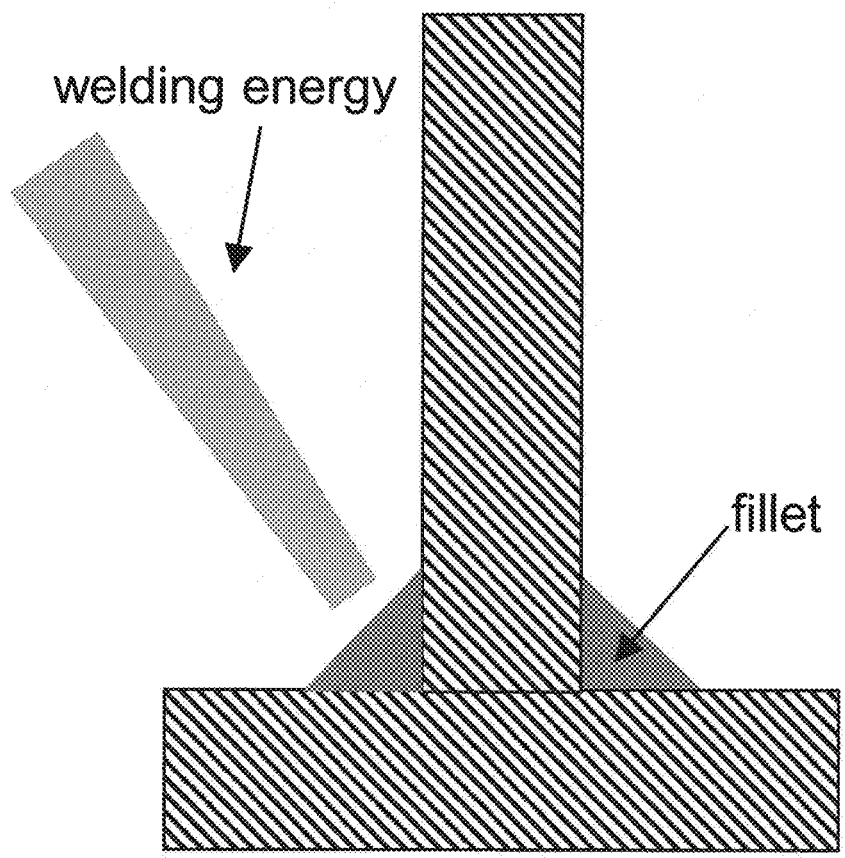
FIG. 1 is a schematic block diagram showing a prior art welding system.

An example of a prior art welding system for welding T-joints is shown in FIG. 1. Welding energy is applied to the corners of the T connection to form a fillet (where the right corner section shown in the figure has already been processed by the welding energy). To obtain dual fillet welds, at least two passes have to be made, or two welding energy sources have to be used to perform the welds concurrently. This type of welding configuration makes it difficult to weld complex joints where the welding head cannot easily access these corner regions. In addition, certain welding techniques have various drawbacks as discussed above. Both the GTAW and EBW require long processing times, and GTAW welding of titanium alloys causes distortion and poor microstructure. Thicker and larger titanium alloy substrates using simply translated LBW and the process configuration shown in FIG. 1 has also been shown to create welds with defects (e.g., pores).

The disclosed laser welding systems and processes address many of the problems described above. The laser welding system described herein applies weld energy in the form of a laser beam to the reverse side of the T connection (i.e., the backside of the cover panel or flange) and includes a beam delivery system configured to manipulate the laser beam in a controlled pattern. The systems and methods disclosed herein create dual fillet welds using a single pass and are capable of being used in complex welding configurations where access to the corner regions of the T-joint is limited. In addition, the weld structures have a uniform hardness, low porosity, and small grain size.

Figure 2A:
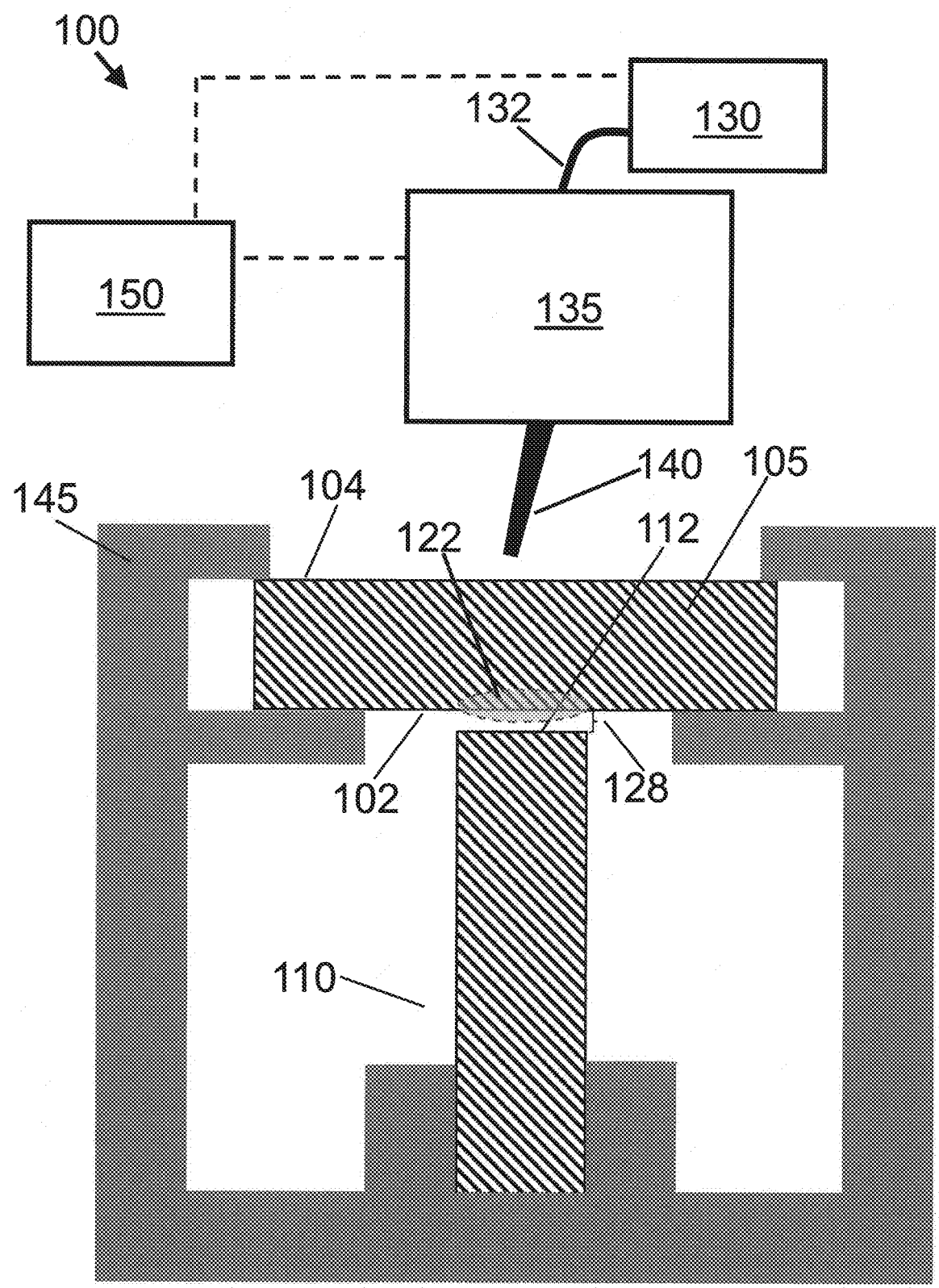
FIG. 2A is a schematic block diagram of a laser welding system in accordance with one or more aspects of the invention.

Referring to FIG. 2A, a laser welding system, generally indicated at 100, includes a fiber laser 130, a beam delivery system 135, and a support structure 145 for positioning a first metal substrate 105 and a second metal substrate 110 in a desired configuration. The first metal substrate 105 has a first planar surface 102 and a second planar surface 104 disposed opposite to the first surface 102. The desired configuration shown in FIG. 2A positions an end face 112 of the second metal substrate 110 proximate to the first planar surface 102 of the first metal substrate 105 such that the second metal substrate 110 is positioned perpendicular to the first metal substrate 105, and is therefore set up for a T-joint type of welding connection. The first metal substrate 105 may therefore be referred to herein as a "flange" or "cover plate," and the second metal substrate 110 may be referred to as a "web" or "rib." In some embodiments the end face 112 of the second metal substrate 105 may be centered along a width dimension of the first metal substrate 105 (e.g., see FIG. 2B).

The support structure 145 functions to hold the first metal substrate 105 and the second metal substrate 110 in a predetermined orientation relative to one another. In some instances, the end face 112 does not abut the first planar surface 102, as shown in FIG. 2A, but in alternative configurations the end face 112 may abut the first planar surface 102, as shown in FIG. 2B.

Figure 2B:
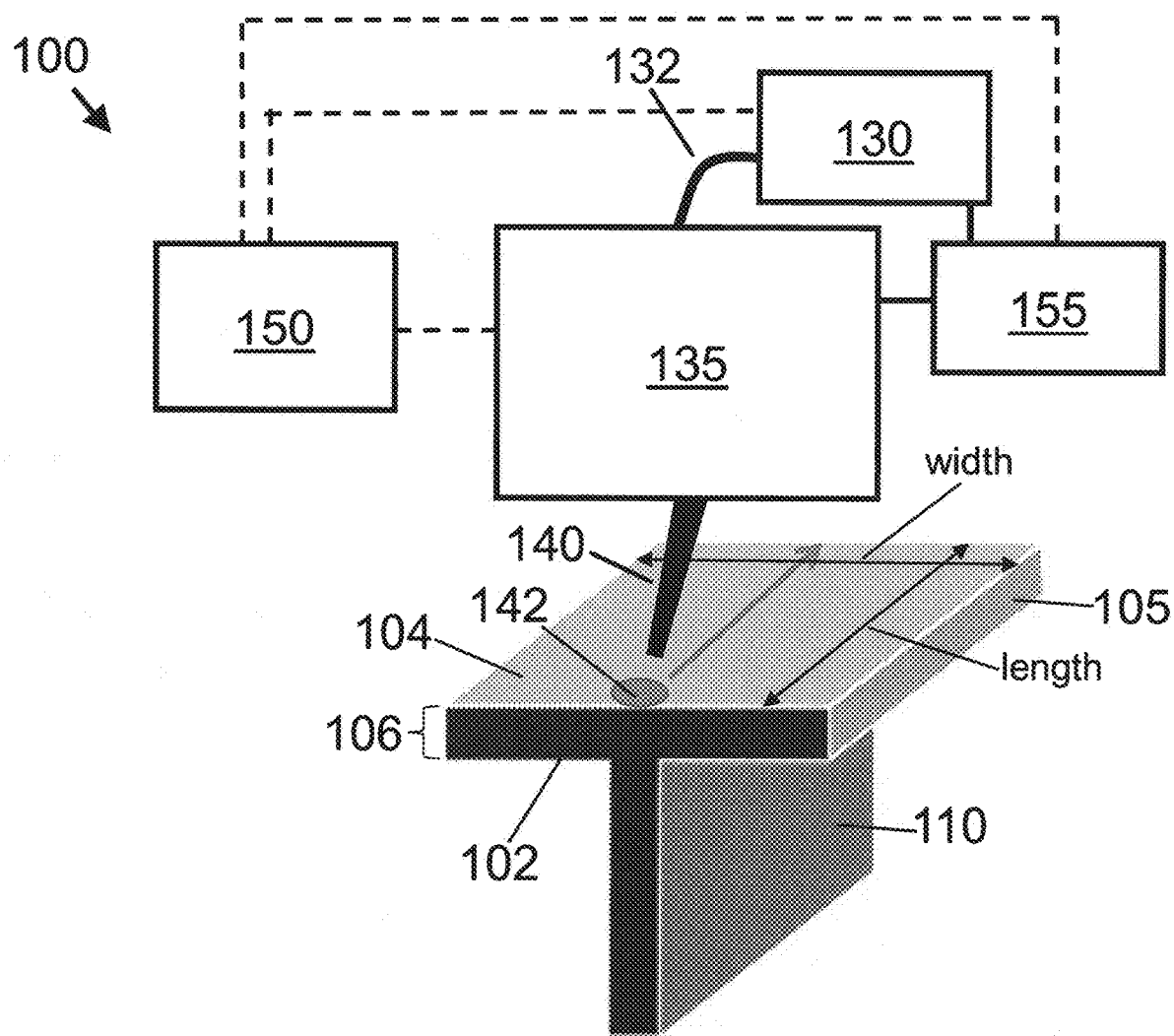
FIG. 2B is a schematic block diagram of the laser and beam delivery system in combination with a perspective view of the metal substrates of the system of FIG. 2A.

The beam delivery system 135 and/or the first and second metal substrates 105 and 110 may be moved relative to each other along at least one axis, e.g., the length of the first metal substrate 105 (see FIG. 2B). For instance, the beam delivery system 135 (and optionally the fiber laser 130) may be located on a motion stage 155 for moving the beam delivery system 135 relative to the first and second metal substrates 105 and 110, as indicated in FIG. 2B. Additionally, or alternatively, the first and second metal substrates 105 and 110 may be located on a motion stage for moving the metal substrates relative to the beam delivery system 135.

According to certain embodiments, the first and second metal substrates 105 and 110 have physical and geometric characteristics that make them suitable for controlled flow when they are in a molten or liquid state, and therefore viable for the backside welding process described herein. The metal substrates have physical properties that make it possible to balance the surface tension of the molten "puddle" of metal material against the various process forces such as gravity, fluid flow, keyhole pressures, etc. so as to maintain the formation of the double fillets. Non-limiting examples of metals that are suitable for being used as the first and second metal substrates 105 and 110 include titanium and titanium alloys. In some embodiments, the first and second metal substrates 105 and 110 may be one of a number of stainless steels. In contrast, pure aluminum is a metal that may not be suitable for the disclosed backside welding processes. However, one or more aluminum alloys may have the desired properties for the disclosed processes. In addition, the geometries of the metal substrates, including the thickness of the first metal substrate 105, also have a role in the capabilities of the disclosed backside welding process. For example, the metal substrates have to be thin enough to form a quality weld region with the understanding that laser energy can be increased for thicker substrates. In various embodiments, the first and second metal substrates 105 and 110 have a surface tension of at least 1.5 N/m at their respective melting temperatures. In various embodiments, the first and second metal substrates 105 and 110 have a thermal conductivity less than 50 W/m·K at atmospheric conditions.

The fiber laser 130 provides a laser energy source for generating a laser beam with sufficient power to perform the welding operations discussed herein. According to some embodiments, the fiber laser 130 may be configured as a Ytterbium fiber laser capable of generating a laser in the near infrared spectral range (e.g., 1060-1080 nm). The fiber laser 130 may be a single mode or multi-mode fiber laser, and may be configured to operate in a continuous wave (CW), quasi-continuous wave (QCW), or pulsed mode. According to some embodiments, the fiber laser 130 is configured to generate a laser beam with power of at least 1 kW. Non-limiting examples of fiber lasers 130 suitable for the laser welding processes described herein include fiber lasers available from IPG Photonics Corporation (Oxford, Mass.), such as the YLS Series.

Referring to FIGS. 2A and 2B, the fiber laser 130 has a delivery fiber 132 that is coupled to the beam delivery system 135. The beam delivery system 135 receives laser energy associated with an input laser beam transmitted by the delivery fiber 132 and is configured to transform the energy distribution of the input laser beam into an output laser beam 140 that produces a beam spot 142 of desired dimensions and energy distribution. The beam delivery system 135 is also configured to apply the laser beam spot 142 to a target area on the second planar surface 102 (i.e., backside surface) of the first metal substrate 105 in a predetermined pattern (also referred to as a "laser movement pattern" or "wobble pattern"), as described in further detail below.

According to at least one embodiment, the beam delivery system 135 is configured as a free-space optics arrangement that includes various optical components, such as mirrors, lenses, prisms, filters, diffractive optics, beam splitters, opto-mechanical and/or electro-optical elements, polarizers, etc., that are used to produce the output beam 140, beam spot 142, and laser movement pattern. For example, the beam delivery system 135 may include one or more curved mirrors or lenses that function as a collimator for collimating the laser light from the delivery fiber 132. The beam delivery system 135 may also include a focus lens and other components for adjusting the focal point of the output beam 140.

Figure 3A:
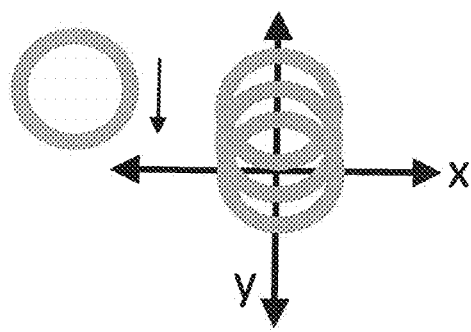
FIGS. 3A-3E are schematic diagrams illustrating different predetermined patterns for laser movement in accordance with one or more aspects of the invention.
Figure 3D:
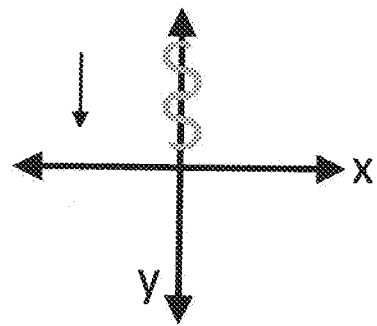
Figure 3B:
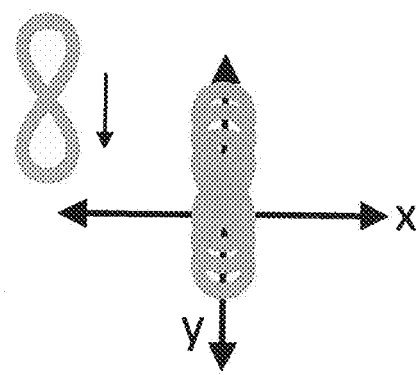
Figure 3E:
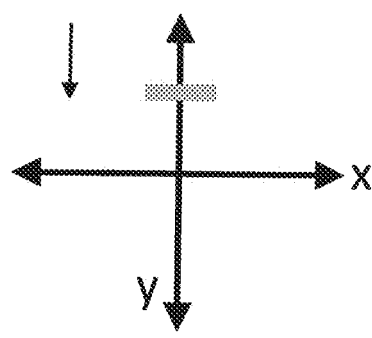
Figure 3C:
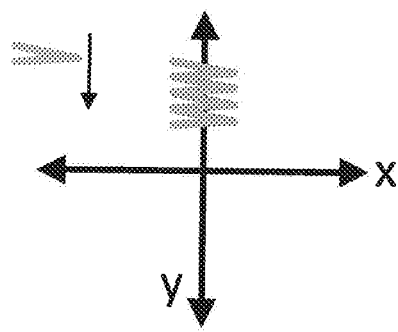

The beam delivery system 135 includes components, such as one or more movable mirrors, that are pivot-able about different axes to cause the output beam 140 and beam spot 142 to move relative to the second planar surface 104 of the first metal substrate 105 in two different axes (e.g., the x and y axes) to create the predetermined pattern along the weld seam. Non-limiting examples of laser movement patterns on the x and y axes that are used to perform stir welding of a seam are shown in FIGS. 3A-3E. FIG. 3A shows a circular pattern (clockwise or counter-clockwise), with the arrow indicating the weld direction and the y-axis functioning as the seam. FIG. 3B shows a figure-eight pattern, which can be rotated 90 degrees to implement an infinity pattern, and FIG. 3C shows a zig-zag pattern. FIG. 3D shows an undulating pattern, and FIG. 3E shows a linear pattern. It is to be appreciated that the illustrated patterns are not exhaustive, and other patterns are also within the scope of this disclosure.

The laser movement pattern or wobble pattern functions to "dissipate" the laser energy output by the output beam 140 and may provide one or more advantages to the laser welding process. For instance, the laser movement pattern may allow for dual fillet welding using a single pass, provide wider process windows, and creates a weld that is superior in quality as compared to conventional laser welding methods. Examples of laser systems that are suitable for implementing the laser output beam 140 in the wobble pattern include the Wobble Welding Head series available from IPG Photonics Corporation.

At least one movable mirror of the beam delivery system 135 may be used for imparting the laser movement pattern. The movable mirrors may be galvanometer mirrors that are movable by galvo motors, which are capable of reversing direction quickly. Other mechanisms for moving the mirrors are also within the scope of this disclosure, including stepper motors. In one embodiment, the beam delivery system 135 includes two movable mirrors of substantially the same size that are each used for different perpendicular axes. In other embodiments, one moveable mirror or more than two movable mirrors may be used.

Figure 4A:
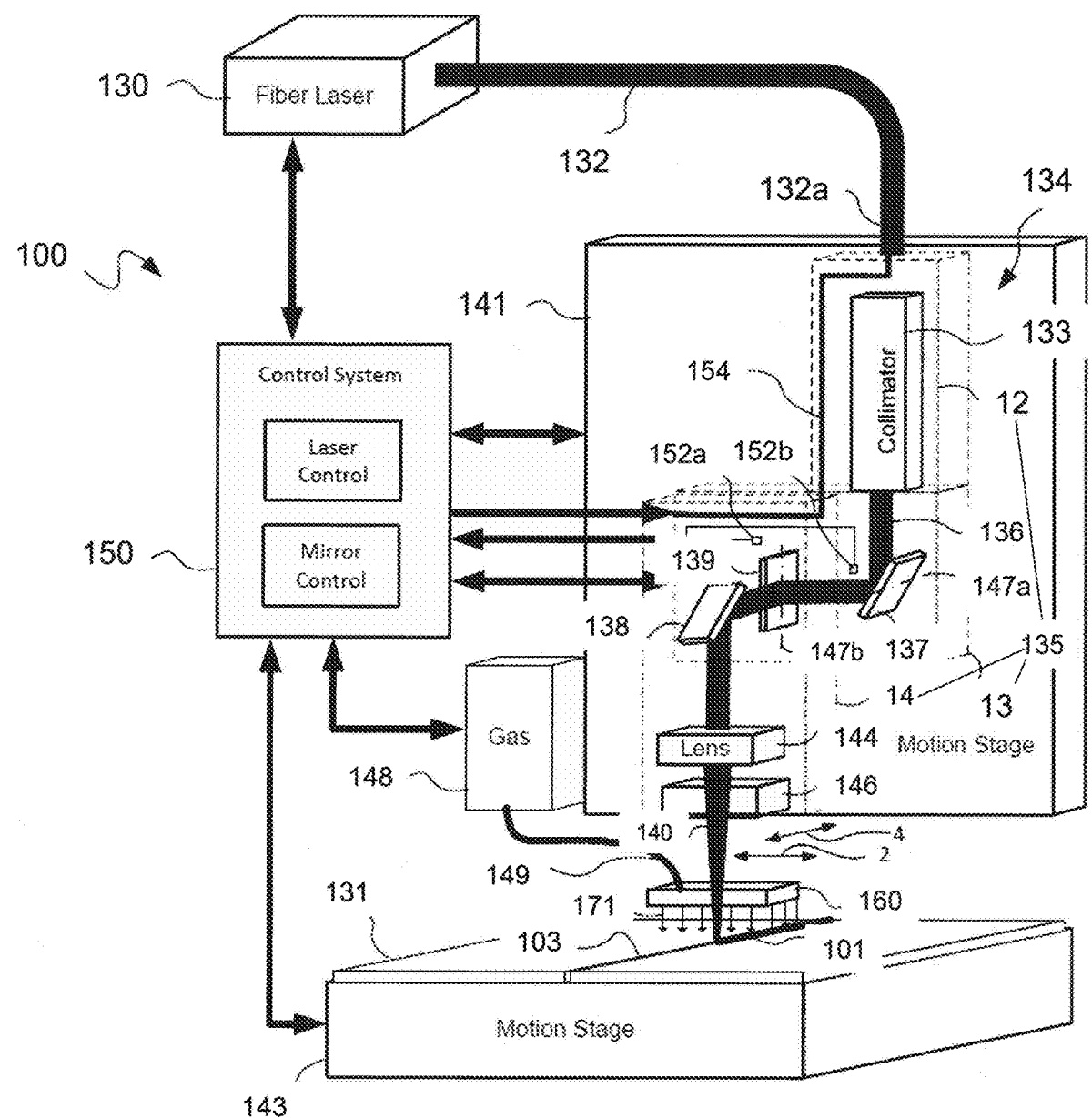
FIG. 4A is a schematic block diagram of a system including a laser welding head that may be used in accordance with aspects of the invention.

One example of a laser welding system that may be used to implement one or more aspects of the invention, including the laser movement pattern, is shown in FIG. 4A. The laser welding system 100 includes a laser welding head 134 coupled to an output or delivery fiber 132 of a fiber laser 130 (e.g., with a connector 132a) for delivering a laser beam 140 to a workpiece 131. The fiber laser 130 is similar to the fiber laser 130 described above in reference to FIGS. 2A and 2B. The laser welding head 134 includes one or more modules 12, 13, 14 that form the beam delivery system 135 that is used to perform welding on the workpiece 131, such as the metal substrates described herein, by welding a seam 103 to form a weld bead 101. The laser welding head 134 and/or the workpiece 131 may be moved relative to each other along the direction of the seam 103. The laser welding head 134 may be located on a motion stage 141 for moving the welding head 134 relative to the workpiece 131 along at least one axis, for example, along the length of the seam 103. Additionally, or alternatively, the workpiece 131 may be located on a motion stage 143 for moving the workpiece 131 relative to the laser welding head 134.

The laser welding head 134 generally includes a collimator 133 for collimating the laser beam from the output fiber 132, at least first and second movable mirrors 137 and 139 for reflecting and moving the collimated beam 136, and a focus lens 144 for focusing and delivering a focused beam 140 to the workpiece 131. In the example shown in FIG. 4B, a fixed mirror 138 is also used to direct the collimated laser beam 136 from the second movable mirror 139 to the focus lens 144. The collimator 133, the movable mirrors 137, 139, and the focus lens 144 and fixed mirror 138 may be provided in separate modules 12, 13, 14, one or more of which can form the beam delivery system 135 described above. The laser welding head 134 may also be constructed without the fixed mirror 138, for example, if the mirrors 137, 139 are arranged such that the light is reflected from the second mirror 139 toward the focus lens 144.

The movable mirrors 137, 139 are pivot-able about different axes 147a, 147b to cause the collimated beam 136 to move and thus to cause the focused beam 140 to move relative to the workpiece 131 in at least two different perpendicular axes 2, 4. The movable mirrors 137, 139 may be galvanometer mirrors that are movable by galvo motors, or other movement mechanisms such as stepper motors. Using the moveable mirrors 137, 139 in the laser welding head 134 allows the laser beam 140 to be moved precisely, controllably and quickly for purposes of beam wobbling without having to move the entire welding head 134 and without using rotating prisms.

Figure 4B:
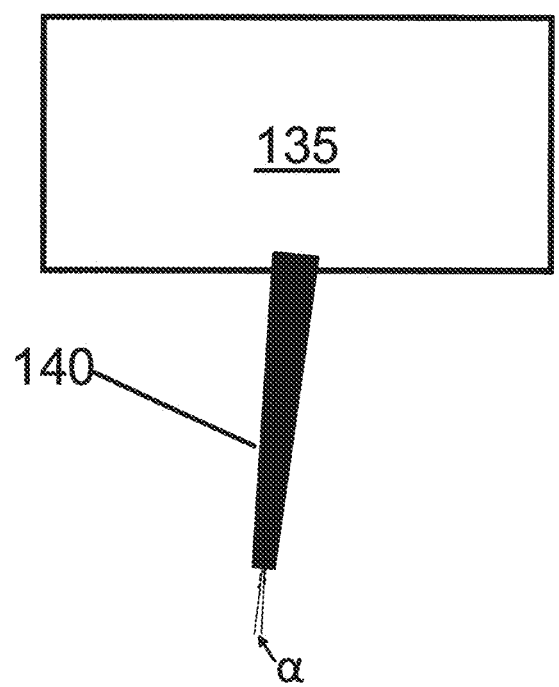
FIG. 4B is a schematic block diagram of a laser beam with a relatively small range of movement provide by a beam delivery system in accordance with one or more aspects of the invention.

In accordance with at least one embodiment, the movable mirrors 137, 139 move the beam 140 within only a relatively small field of view (e.g., less than 30×30 mm) by pivoting the beam 140 within a scan angle of less than 10 degrees, and in some instances at about 1-2 degrees, as shown by alpha (α) in the schematic of FIG. 4B. This limited movement may be referred to as "wobble," and examples of systems and devices capable of producing the laser movement pattern are discussed in reference to the wobble module and laser welding head disclosed in U.S. patent application Ser. No. 15/187,235 (hereafter referred to as "the '235 application"), which is fully incorporated herein by reference. As explained in the '235 application, the term "wobble" refers to reciprocating movement of a laser beam (e.g., in two axes) and within a relatively small field of view defined by a scan angle of less than 10 degrees. This limited movement is in contrast to conventional laser scan heads, which provide movement of the laser beam within a much larger field of view (e.g. 50×50 mm and larger) and are designed to accommodate the larger field of view and scan angle. The use of the movable mirrors 137, 139 that provide the relatively small field of view and the small scan angle provides for faster speeds, allows for the use of less expensive components such as lenses, and allows for the use of accessories such as an air knife and/or gas assist accessories.

Because the movable mirrors 137, 139 move the beam within a relatively small field of view and scan angle, the second mirror 139 may be substantially the same size as the first mirror 137. In contrast, conventional galvo scanners generally use a larger second mirror to provide for the larger field of view and scan angle and the larger second mirror may limit the speed of movement in at least one axis. A smaller sized second mirror 139 (e.g., about the same size as the first mirror 137) in the welding head 134 thus enables the second mirror 139 to move with faster speeds as compared to larger mirrors in conventional galvo scanners that provide large scan angles.

Furthermore, the smaller field of view provided by the moveable mirrors 137, 139 also means that a larger multi-element scanning lens (e.g., an F-theta lens, a field flattening lens, or a telecentric lens) with large diameters (e.g., a 300 mm diameter lens for a 33 mm diameter beam) is not required and not used. In contrast to these conventional laser scan heads, the focus lens 144 may include focus lenses known for use in laser welding heads and having a variety of focal lengths ranging, for example, from 100 mm to 1000 mm. According to one embodiment, a 50 mm diameter plano convex F300 focus lens may be used to focus a beam having a diameter of about 40 mm for movement within a field of view of about 15×5 mm. This smaller focus lens also allows for the use of additional accessories, such as an air knife and/or gas accessories, to be used.

Other optical components that may be optionally used in the beam delivery system include beam splitters and diffractive optics, the latter of which may be positioned between the collimator 133 and the mirrors 137, 139.

The laser welding system 100 of FIG. 4A also includes a gas shielding device 160 coupled to a gas source 148 via at least one gas distribution tube 149. An example of a gas shielding device 160 is described in further detail below. The shield gas 171 may include any shield gas used in welding or laser processing, such as inert and semi-inert gases.

A protective window 146 may be provided in front of the lens 144 to protect the lens and other optics from the debris produced by the welding process. The protective window 146 may also be integrated into or replaced by the gas shielding device 160.

Turning briefly back to FIGS. 2A and 2B, in accordance with certain embodiments the beam delivery system 135 may also include components configured to function as a conventional laser scan head for applications where a large field of view is desired. Conventional laser scan heads use multi-element scanning lenses, such as an F-theta lens, a field flattening lens, or a telecentric lens, with large diameters (e.g., a 300 mm diameter lens for a 33 mm diameter beam) to focus the beam within the larger field of view. In certain embodiments, the optics included in the conventional scan head may be configured to generate the wobble patterns discussed herein.

The backside surface welding system and process disclosed herein uses several process parameters that provide wide process windows for achieving high quality welds. Non-limiting examples of several of these process parameters are discussed below in reference to FIGS. 5A and 5B.

Figure 5A:
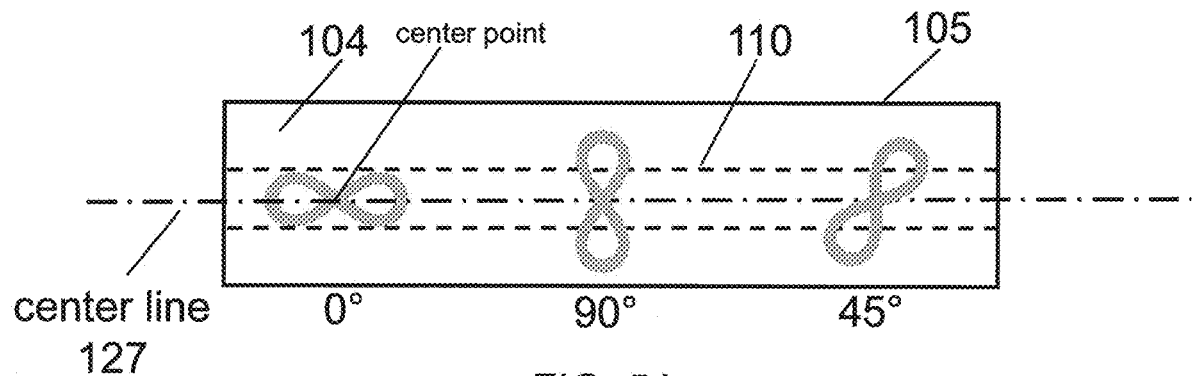
FIG. 5A is a top view of two metal substrates prior to being welded together and shows an example of a laser movement pattern oriented in three different configurations in accordance with one or more aspects of the invention.

According to at least one embodiment, one or more "wobble" parameters may function as process parameters that can be adjusted or otherwise modified for purposes of process optimization, such as controlling laser energy density. These parameters include the wobble pattern (or "wobble mode"), wobble frequency, wobble amplitude, and wobble orientation. One or more of these parameters may influence the "interaction" time that the laser beam has with the material of the metal substrate. FIG. 5A illustrates three different orientations of the wobble pattern, which in this example is an infinity or figure-eight pattern, depending on the orientation. FIG. 5A shows a top view of the second planar surface 104 of the first metal substrate 105 with the second metal substrate 110 positioned perpendicularly and centered along the width dimension of the first metal substrate 105 (i.e., as in FIGS. 2A and 2B), and is indicated by dashed lines. In each orientation (i.e., 0°, 90°, and 45°) the center point of the pattern is aligned with a center line 127 that runs through the center of the second planar surface 104 (and center of the end face 112 of the second metal substrate 110). The beam delivery system 135 includes optic components that are configured to perform this alignment and orientation and can be adjusted or otherwise controlled by a controller 150 (described in further detail below). The wobble pattern may be oriented at any desired angle (besides those shown) using the beam delivery system 135.

Figure 5B:
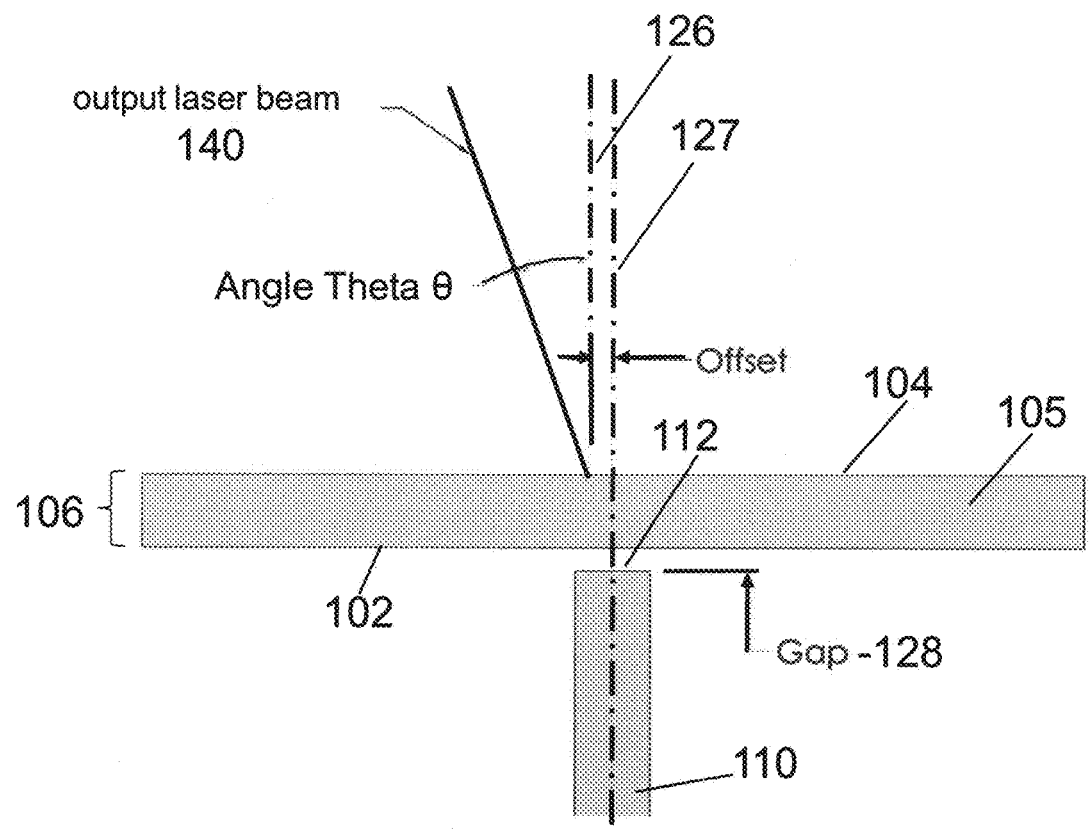
FIG. 5B is a side view of the two metal substrates of FIG. 5A in combination with several process parameters in accordance with one or more aspects of the invention.

Referring to FIG. 5B, a side view of the first and second metal substrates of FIG. 5A are shown. According to at least one embodiment, the beam delivery system 135 may be configured to direct the output laser beam 140 that supplies the beam spot 142 to the second planar surface 104 of the first metal substrate 105 at an incident angle theta θ of ±10 degrees from a reference line 126 that is perpendicularly incident to the second planar surface 104 (and end face 112). The output laser beam 140 may also be incident ±10 degrees at an angle β from a reference line (not shown in FIG. 5B) that runs along the length of the second metal substrate 110 (and is therefore into the plane of the 2D configuration shown in FIG. 5B). In some embodiments, the gap 128 between the end face 112 and the first planar surface 102 may be a distance of up to about one quarter of the thickness 106 of the first metal substrate 105.

Figure 6:
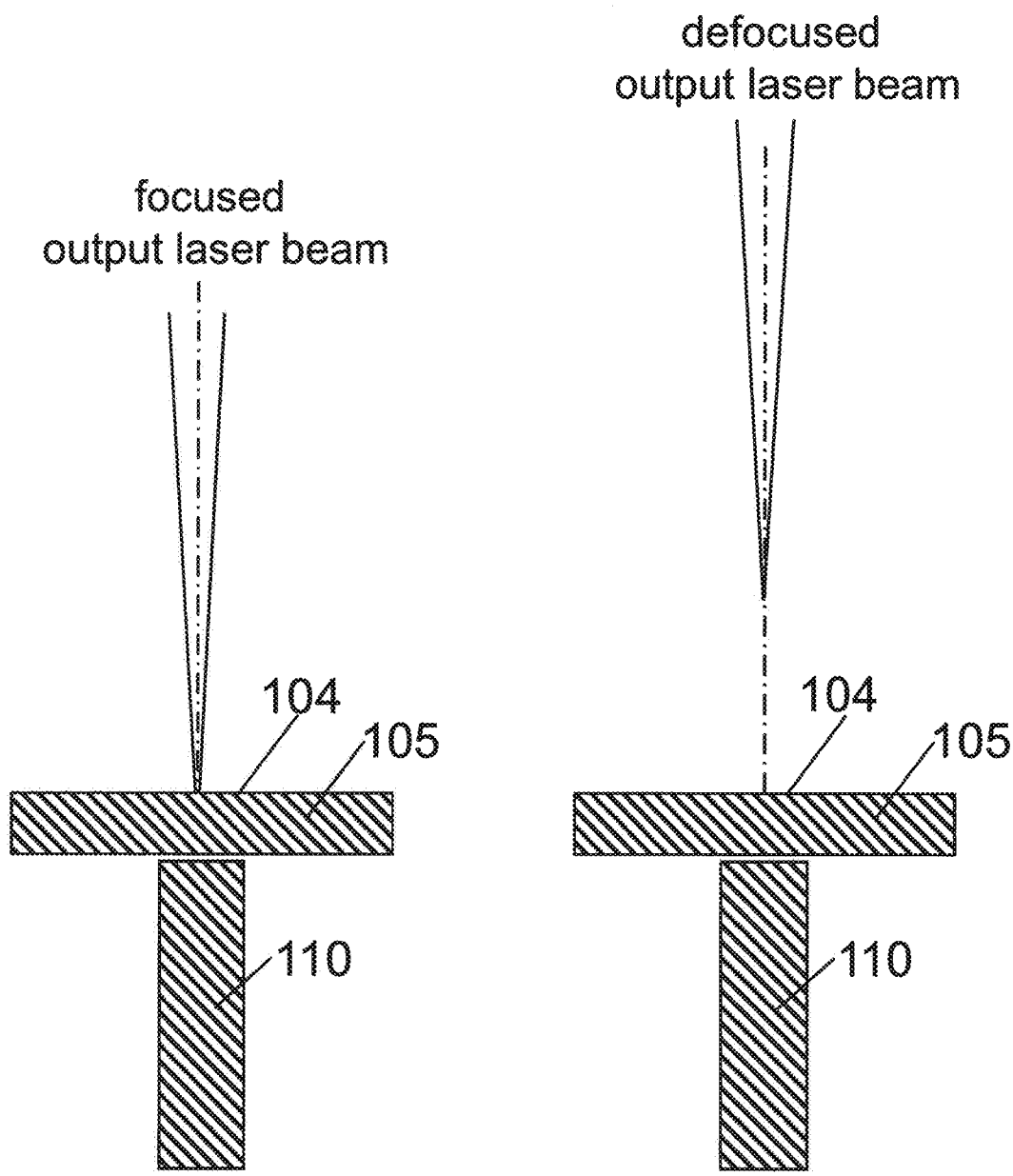
FIG. 6 is a side view of two metal substrates in combination with examples of focused laser irradiation and defocused laser irradiation in accordance with one or more aspects of the invention.

According to at least one embodiment, the beam delivery system 135 is configured to generate a defocused output laser beam 140. FIG. 6 shows first and second metal substrates 105 and 110 where the output laser beam on the left has a focal point that coincides with the second planar surface 104 (i.e., a focused output laser beam), and the output laser beam on the right has a focal point that is positioned above the second planar surface 104 (i.e., a defocused output laser beam). In some instances, the defocused output laser beam has a focal point that is positioned below the second planar surface 104. The defocused output beam 140 generates a beam spot 142 having a reduced energy density and an increased diameter, which in certain instances creates a higher quality weld. The defocused laser beam has a more Gaussian beam profile (i.e., with a hotter center and decreasing with increasing radius). The power distribution provided by the defocused laser beam allows for fusion of the flange to the rib in one area of the weld region and melting of the flange in another area of the weld region. In alternative embodiments, the beam delivery system 135 is configured to generate an output laser beam that is focused.

In accordance with at least one embodiment, one or more components of the laser welding system 100, such as the fiber laser 130 energy source, the beam delivery system 135, and motion stage 155 may be controlled using a set of operating parameters to perform an optimized welding process. For example, the beam delivery system 135 may be configured to generate a beam spot 142 having desired dimensions. The desired dimensions may depend on the choice of laser movement pattern as well as the dimensions of the first and second metal substrates (e.g., the height or thickness of the second metal substrate 110). The beam delivery system 135 may also be configured to provide different shapes to the beam spot 142. For instance, besides a spherical shape, the beam spot 142 may be donut shaped, rectangular, or elliptical. Laser power also functions as another operating parameter, as well as a velocity of the beam spot in reference to the center point of the pattern moving across the second planar surface 104 (also referred to as the traveling speed or welding speed).

Figure 7A:
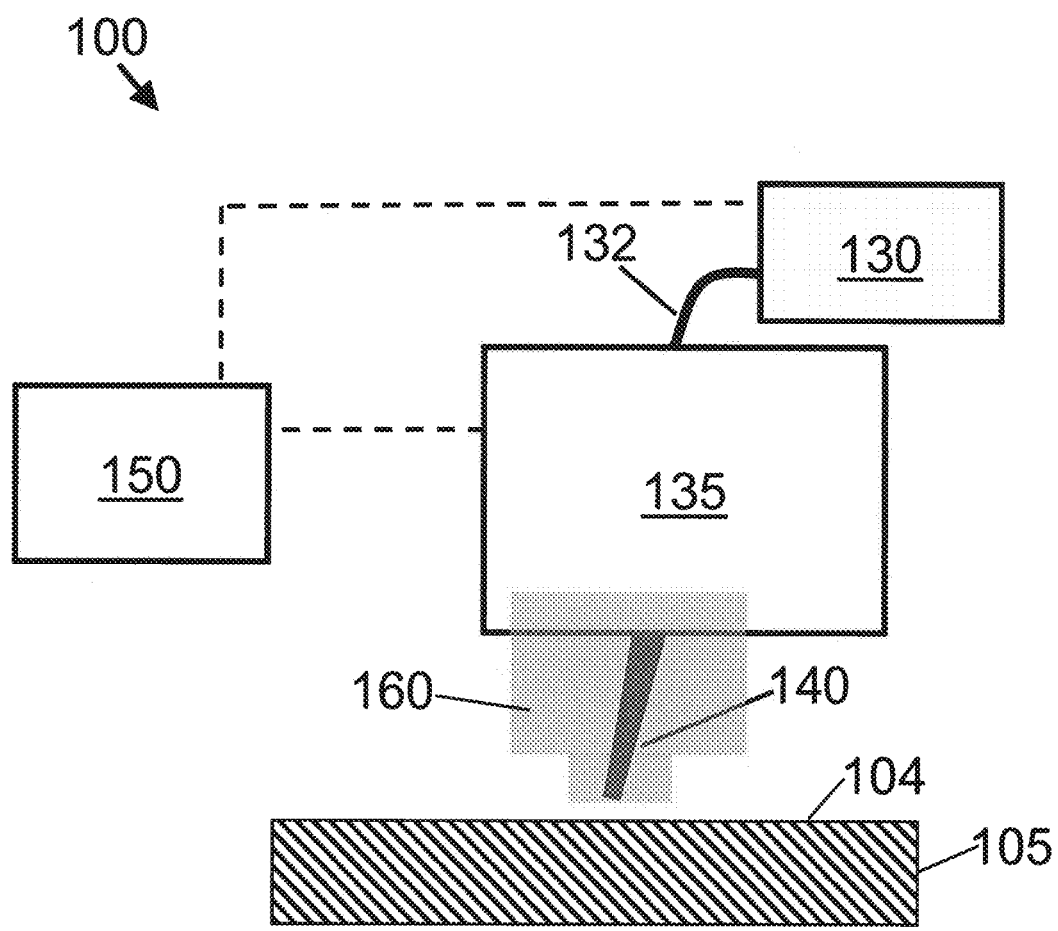
FIG. 7A is a schematic block diagram of another example of a laser welding system in accordance with one or more aspects of the invention.
Figure 7C:
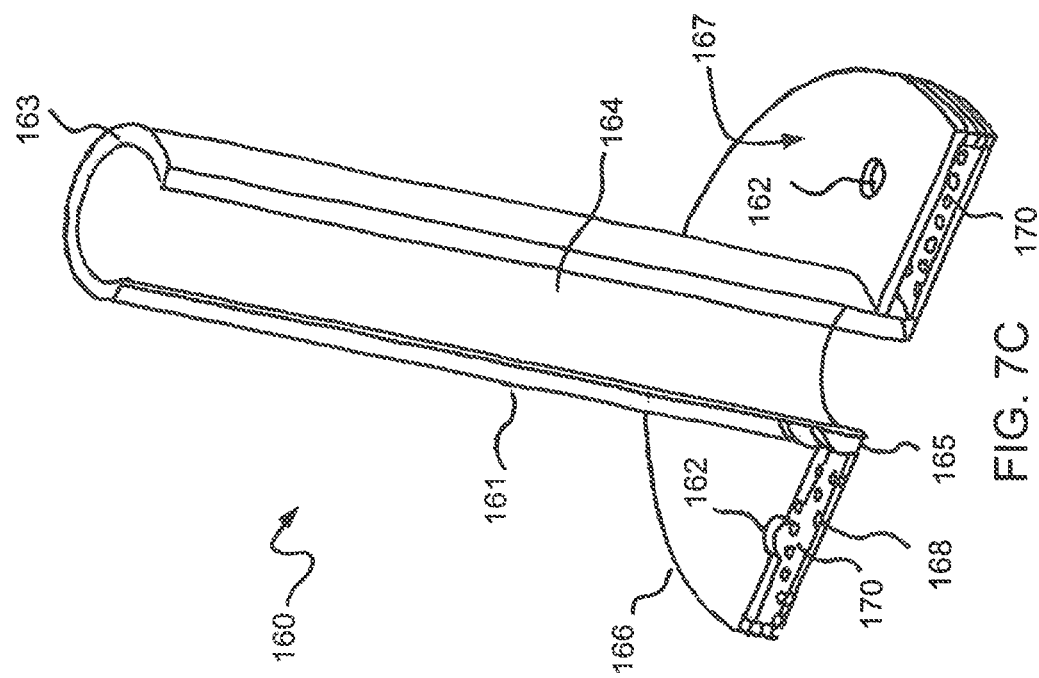
FIG. 7C is a cross-sectional perspective view of the gas shielding device shown in FIG. 7B.
Figure 7B:
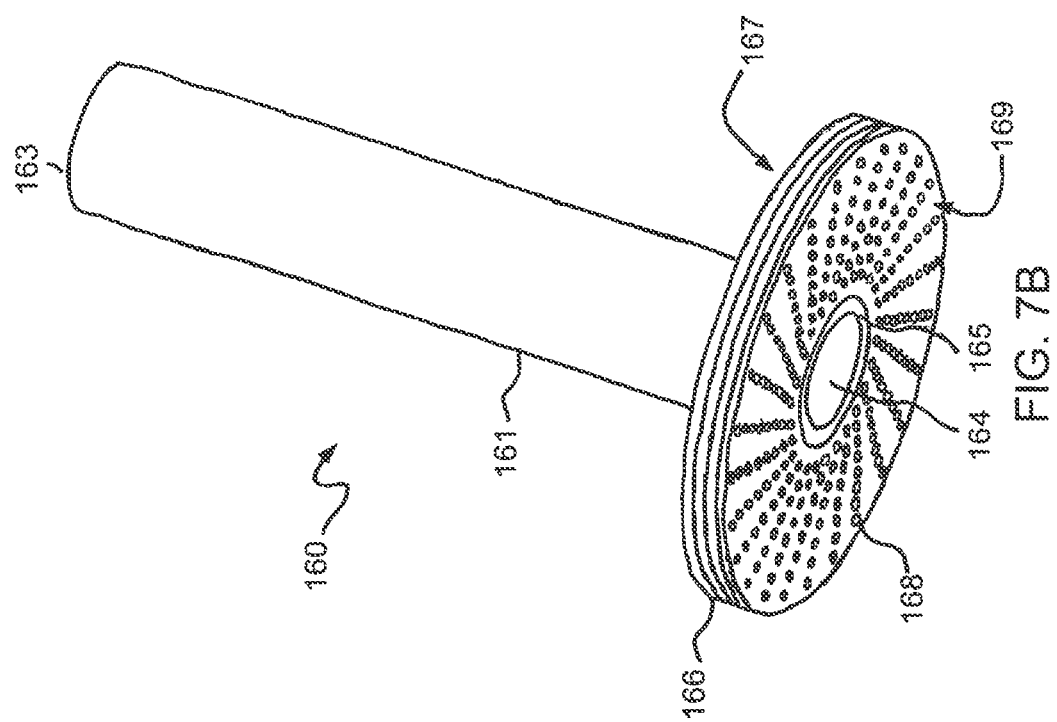
FIG. 7B is a bottom perspective view of a gas shielding device that may be used in accordance with aspects of the invention.

Referring now to FIGS. 7A-7C, in accordance with some embodiments, the laser welding system 100 may also include a shielding device 160 that is configured to direct a flow of inert shielding gas at the target area, and similar to the shielding device 160 mentioned above in reference to laser welding system 100 of FIG. 4A. The shielding device 160 in the example of FIG. 7A is shown as partially transparent and is configured to house at least a portion of the output laser beam 140. For instance, the shielding device 160 may have a central aperture that is configured to include the output laser beam 140. The shielding device 160 may also be coupled to the beam delivery system 135, as indicated in the example shown in FIG. 7A.

A shielding disc having a plurality of openings may be coupled to the central aperture that are configured to direct a flow of inert shielding gas in a direction substantially perpendicular to the second planar surface 104. One or more gas distribution tubes may also be operatively coupled to the plurality of openings of the shielding disc. One non-limiting example of such a shielding device that may be suitable for use with the methods and systems disclosed herein is shown in FIGS. 7B and 7C and described in U.S. Provisional Application No. 62/725,028, (hereafter referred to as "the '028 application") filed Aug. 30, 2018, which is incorporated herein by reference. FIGS. 7B and 7C show a bottom perspective view and a cross-sectional perspective view of a gas shielding device, generally indicated at 160, described in the '028 application. The shielding device 160 includes a neck 161 for passing a laser beam (e.g., as described above) to a workpiece and a gas shielding plate 166 coupled to the neck 161 for diffusing and distributing shield gas to the workpiece in a welding region. The neck 161 defines a central aperture 164 extending from a first end 163 to a second end 165 and configured to allow the laser beam to be directed through the shielding plate 166 to the workpiece on the opposite side of the shielding plate 166. The shielding plate 166 is coupled to the neck 161 proximate the second end 165 and extends circumferentially around the central aperture 164 such that the shielding plate 166 is coaxial with the central aperture 164 receiving the laser beam. In some instances, the central aperture 164 may have a diameter in a range of about 10-60 mm.

The shielding plate 166 includes one or more gas inlets 162 on a first surface 167 and a plurality of gas outlets 168 on a second surface 169, which is opposite the first surface 167 and will face the workpiece during use. The shielding plate 166 defines a gas diffusing region 170 that fluidly couples the gas inlet(s) 162 to the plurality of gas outlets 168. In some instances, the shield gas passes through the gas inlet(s) 162 into the gas diffusing region 170 and then out the gas outlets 168 substantially perpendicular to the workpiece. As such, the shielding plate 166 and gas outlets 168 are designed and configured to diffuse the shield gas and provide a laminar flow of shield gas in the processing or weld area. Multiple gas inlets 162 may be evenly distributed around the first surface 167 of the shielding plate 166. In some instances, the gas diffusing region 170 may include a porous material, such as the non-woven pads available from 3M under the name Scotch-Brite™ General Purpose Scour Pads, or any other diffuser material capable of providing a laminar flow distribution from the gas outlets 168.

The gas outlets 168 may be spaced across a substantial portion of the second side 169 of the shielding plate 166 to distribute the shield gas across a relatively wide area that includes at least the region encompassed by the laser beam moving in the predetermined pattern and the processing or weld area. Examples of the shielding plate 166 may have a diameter in a range of about 100 mm to 150 mm, and may be circular in shape, although other shapes are also within the scope of this disclosure, including polygonal and oblong shapes. The gas outlets 168 may be relatively small holes or openings with each having a diameter in a range of about 0.2-5.0 mm. The gas outlets 168 are distributed in a pattern on the second side 169 of the shielding plate 166 to provide adequate diffusion to create the laminar flow of shield gas. The illustrated pattern in FIG. 7B shows the gas outlets 168 arranged in lines extending from a central portion of the shielding plate 166 to an outer portion of the shielding plate 166. Other patterns are also contemplated, non-limiting examples of which include concentric circles and radial lines. The gas outlets 168 may also be substantially evenly distributed across the second surface 169 of the gas shielding plate 166. The size and number and location of the gas inlets 162 and gas outlets 168 and the gas pressure may be varied to provide a desired laminar flow. The gas shielding device 160 may also include a cooling feature, such as water jacket that can be used to surround the neck 161.

Referring back to FIGS. 2A and 2B, the operating parameters (e.g., wobble parameters, laser power, beam shape and dimensions, velocity, etc.) may be implemented by a controller 150 configured to control components of the laser welding system 100. For instance, the controller 150 may control the fiber laser 130 and beam delivery system 135 to generate a beam spot 142 of a particular size and dimension that moves in a desired pattern, and/or output laser energy at a particular peak power, pulse width, fluence, etc. The beam spot 142 irradiates a target area on the second planar surface 104 that is positioned over an intersection region 122 (see FIG. 2A) of the first planar surface 102 where the end face 112 is positioned proximate to the first planar surface 102. The controller 150 is also operatively coupled to motion stage 155, which in the example shown in FIG. 2B is configured to move at least one of the fiber laser 130 and the beam delivery system 135 in at least one axis, as indicated by the arrow. This movement causes the beam spot 142 to be directed along a length of the first metal substrate 105 in the example shown in FIG. 2B.

In some instances, the controller 150 may be configured to operate according to a pre-set or predetermined operating control scheme, and in other instances the controller 150 may be configured to operate in a feedforward or feedback control scheme using information obtained from one or more sensors or other sources of input (e.g., operator), and may therefore be operatively coupled to these sources of input. The controller 150 includes hardware (e.g., a general purpose computer) and software that may be used in controlling the components of the system.

In reference to the laser welding system 100 of FIG. 4A, the control system 150 is used for controlling the fiber laser 130, the positioning of the movable mirrors 137, 139, and/or the motion stages 141, 143, for example in response to sensed conditions in the welding head 134, a detected location of the seam 103, and/or movement and/or a position of the laser beam 140. The laser welding head 134 may include sensors such as first and second thermal sensors 152a, 152b proximate the respective first and second movable mirrors 137, 139 to sense thermal conditions. The control system 150 is electrically connected to the sensors 152a, 152b for receiving data to monitor the thermal conditions proximate the movable mirrors 137, 139. The control system 150 may control the fiber laser 130, for example, by shutting off the laser, changing the laser parameters (e.g., laser power), or adjusting any other adjustable laser parameter. For instance, the control system 150 may cause the fiber laser 130 to shut off in response to a thermal condition sensed by one or both of the sensors 152a, 152b and indicative of a mirror malfunction resulting in high temperatures or other conditions caused by the high power laser. In some instances, the controller may cause the fiber laser 130 to shut off by triggering a safety interlock configured between the output fiber 140 and the collimator 133 such that the safety interlock condition is triggered and the laser is shut off when the output fiber 140 is disconnected from the collimator 133. An interlock path 154 may thus extend between the output fiber 140 and the control system 150 to allow the control system 150 to trigger the safety interlock condition. The control system 150 may also monitor the welding operation by receiving data from a camera/detector (not shown), for example, representing a detected location of the seam 103.

The control system 150 may also control the positioning of the movable mirrors 137, 139 in response to the detected location of the seam 103 from a camera/detector, for example, to correct the position of the focused beam 140 to find, track, and/or follow the seam 103.

Figure 2C:
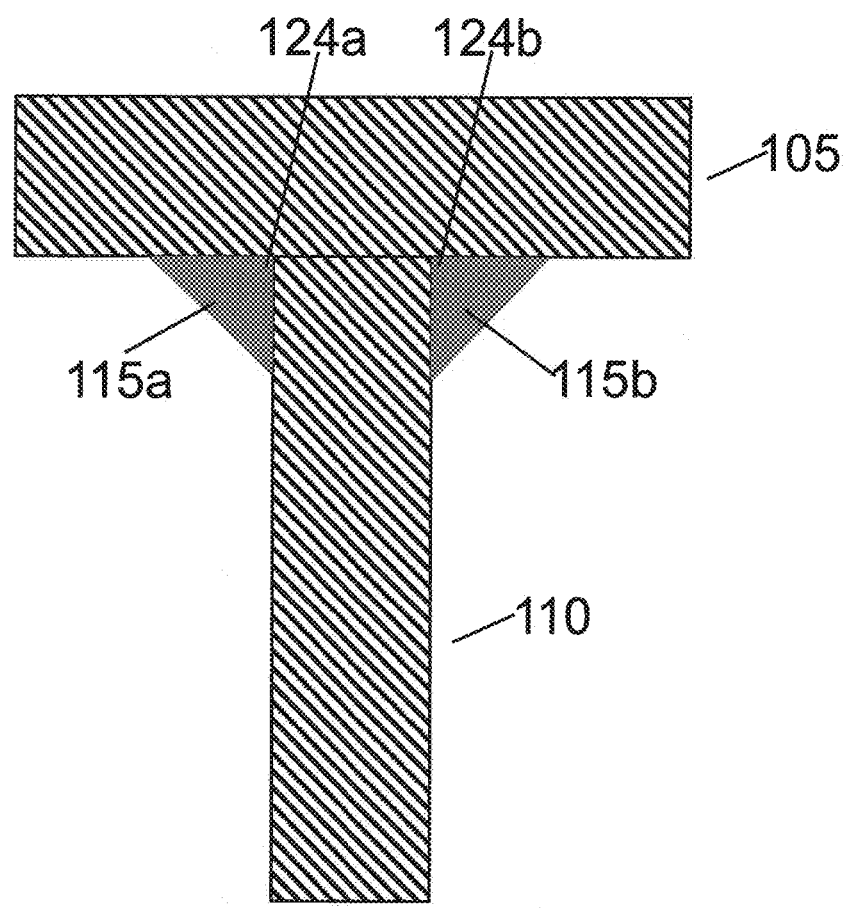
FIG. 2C is a simplified side view of the metal substrates of the system of FIG. 2A after being welded together.
Figure 2D:
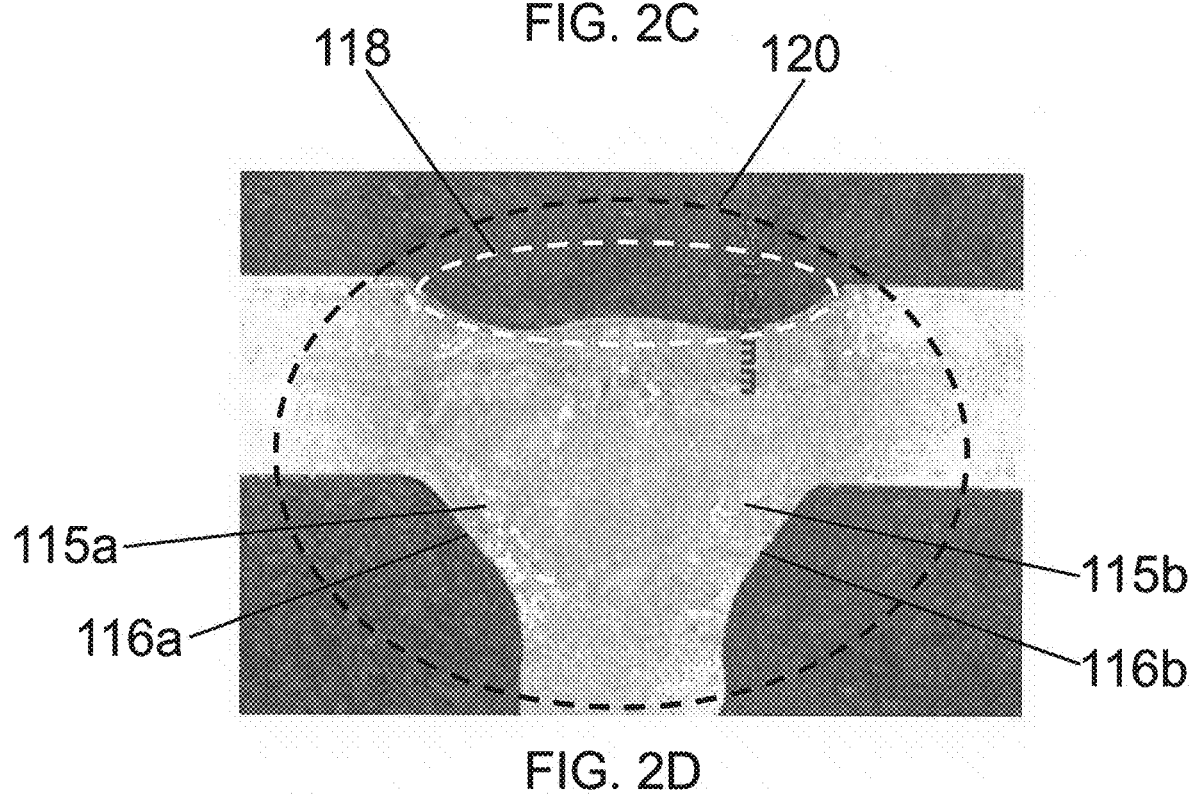
FIG. 2D is a micrograph of a cross-section of two metal substrates formed using a laser welding system similar to the system of FIG. 2A.

Referring now to FIGS. 2C and 2D, once the target area of the second planar surface 104 is irradiated with laser energy, a weld region 120 forms in the first and second metal substrates 105 and 110 that includes the altered crystalline structure, and includes a fusion zone (FZ) in which metal material from the two substrates coalesce, and a heat-affected zone (HAZ) adjacent to the fusion zone. According to at least one embodiment, a cross section of the weld region has a uniform hardness, as described further below in the Examples. The weld region 120 includes a dual fillet weld, where fillet welds 115a and 115b form in each corner area 124a and 125b respectively, between the first and second metal substrates 105 and 110. Each fillet weld 115 and 115b has a weld face 116a and 116b, respectively, with a smooth profile, as indicated in the micrograph of FIG. 2D. A smooth profile in the weld face indicates a weld with greater structural integrity than a weld having a weld face with an irregular or "jagged" or "rough" appearance and/or depressions in the weld face. As indicated in FIG. 2D, the weld region 120 may extend through a thickness of the first metal substrate 105 and a thickness of the second metal substrate 110. In some instances, the fusion zone of the weld region may extend through the thickness of the first and second metal substrates 105 and 110. The interface between the flange and rib is therefore entirely consumed. The weld region 120 may also have a low porosity and small grain structure. Irradiation also creates an undercut 118 in the second planar surface 104 of the first metal substrate 105. According to at least one embodiment, the porosity of the weld region is in accordance with at least one of A, B, or C class requirements set forth in one or more aerospace standards, including SAE Aerospace Material Specifications AMS-STD-2219 and AMS-STD-1595.

The disclosed welding processes may also include other steps or actions not explicitly discussed above. For instance, the metal substrates may be cleaned prior to and/or after irradiation, and after welding the metal substrates may be subjected to a heat treatment process as known in the art.

EXAMPLES

Functions and advantages of the embodiments of the systems and techniques disclosed herein may be more fully understood based on the examples described below. The following examples are intended to illustrate various aspects of the disclosed laser welding systems and processes, but are not intended to fully exemplify the full scope thereof.

The following examples was performed using an arrangement similar to that depicted in FIGS. 2A and 2B using metal substrates that were titanium alloy (Grade 5) having dimensions (L×W×H) of (300 mm×25 mm×1.6 mm). The fiber laser used was an IPG Fiber laser YLS 15000 (IPG Photonics Inc., Oxford Mass.) having an output power of 15,000 Watts. The beam delivery system was implemented using an IPG FLW-D50-W wobble head (also available from IPG Photonics).

Example 1—Implementation of Wobble (Laser Movement Pattern)

Figure 8A:
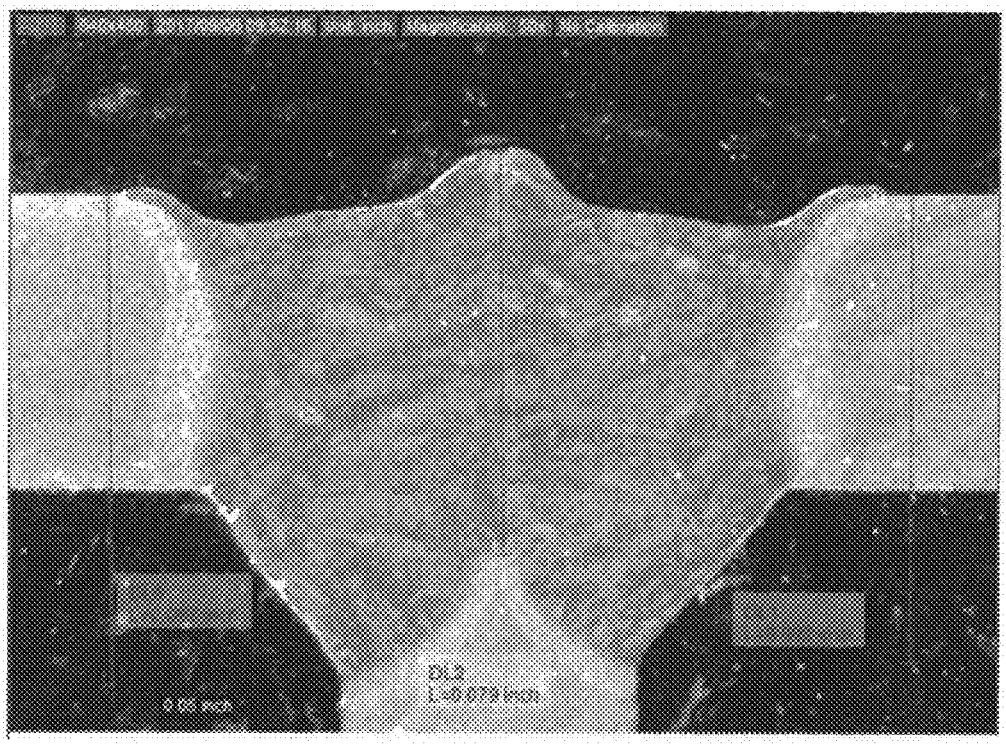
FIGS. 8A and 8B are micrographs of a cross-section of two metal substrates formed without and with a laser movement pattern in accordance with one or more aspects of the invention.

A control was performed without the use of the wobble pattern, using process parameters where laser power was 4500 W and the welding speed was 150 mm/s. Three passes were required across the second planar surface of the first metal substrate to achieve the weld, and a micrograph of the cross-section of the metal substrate is shown in FIG. 8A. The results indicate large and distinct HAZ regions adjacent the FZ regions, and a non-homogenous appearance in the FZ region. The weld faces are also not symmetrical and are irregularly-shaped.

Figure 8B:
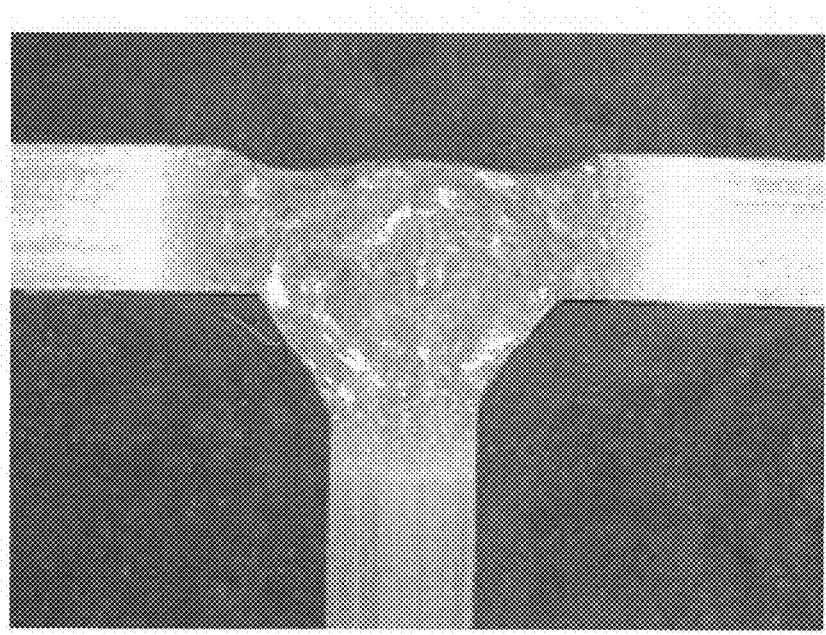

A comparison test using a wobble pattern was performed with the following process parameters:
Laser power: 2100 W
Velocity 20 mm/s
Defocusing: +10 mm (above second planar surface)
Wobble pattern: figure eight
Wobble frequency: 60 Hz
Wobble Amplitude: 20 mm Only a single pass was required to obtain the cross-section shown in the micrograph of FIG. 8B and shows a FZ that extends through the thickness of the first metal substrate and the second metal substrate, and small HAZ areas adjacent the FZ in comparison to FIG. 8A. The FZ also appears homogenous and the weld faces are more symmetrical and smooth than the fillets formed in FIG. 8A. The undercut had a maximum depth of 0.410 mm.

Example 2—Hardness Results

The sample obtained using the set-up discussed above in reference to FIG. 8B was tested for hardness. Microhardness profiles along three different lines (where the distance between each data point was 100-200 microns) spanning a cross section of both the weld region and the base material were obtained using a DuraScan 70 micro hardness tester (available from Emco-Test Prüfmaschinen GmbH)). FIG. 9A shows a micrograph of the cross-section of the sample and the placement of the three lines, and FIGS. 9B-9D show the hardness profiles for each line in units of Vickers hardness (HV),) for each line. For instance, the range of hardness values does not exceed 50 HV and the absolute value did not exceed 400 HV. The results indicate a uniform hardness across not only the weld region, but across both the base metal (BM) and weld region areas. For instance, evidence of contamination would result in spikes in these graphs, which is indicative of oxidation.

Example 3—Microstructure Tests

Figure 10:
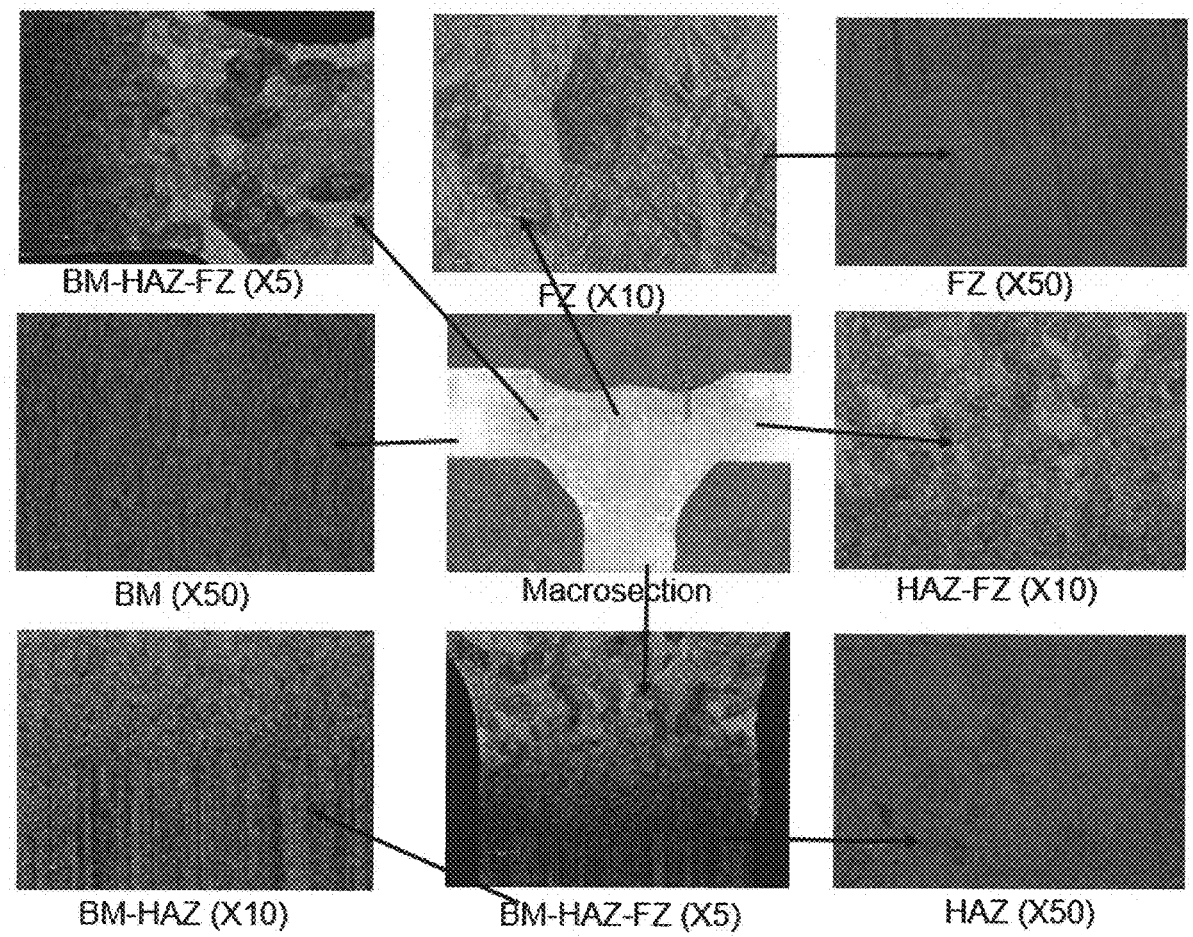
FIG. 10 includes a micrograph of a cross-section of two metal substrates welded according to aspects of the invention and various micrographs showing the grain structure of various regions in the cross-section.

The microstructure of the base metal and weld region was inspected on the sample obtained using the set-up discussed above in reference to FIG. 8B. The results are shown in FIG. 10, with different magnifications of the inspected regions as labeled in the figure. The results confirmed that the FZ is homogeneous with a small primary crystal grain size of about 0.4 mm and a larger secondary grain size of several microns. The HAZ is also small, and did not infiltrate the fusion zone.

Example 4—Wobble Optimization Test 1

Figure 11A:
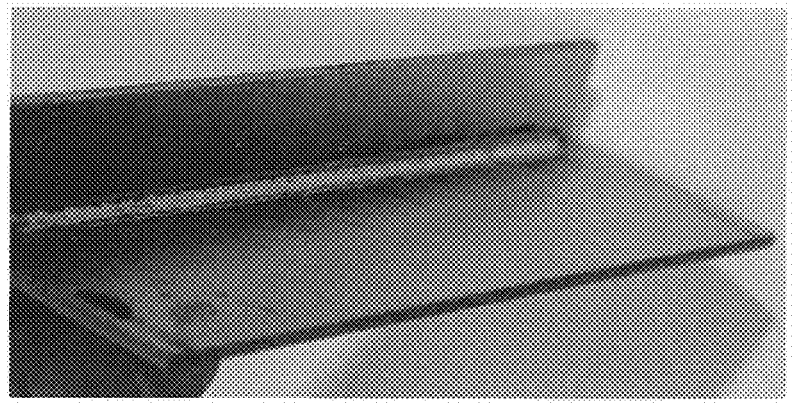
FIGS. 11A and 11B are photographs of two metal substrates formed with different process parameters in accordance with one or more aspects of the invention.
Figure 11B:
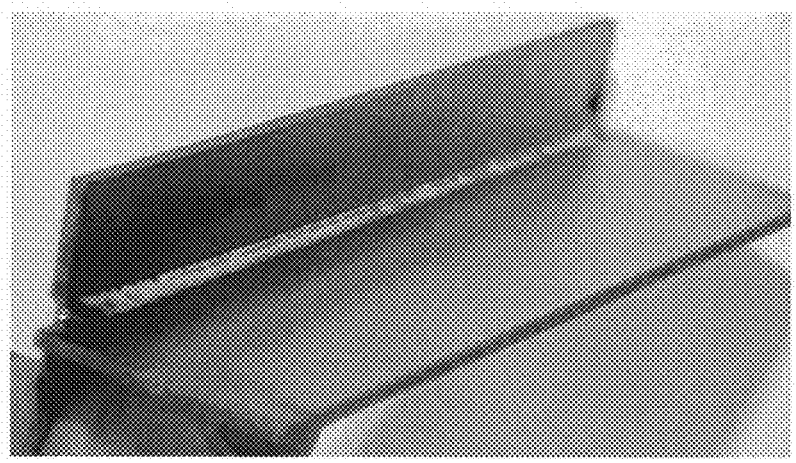

A test was performed to see if adjusting certain process parameters would decrease the evidence of "spatter" on the root region of the weld formation. FIGS. 11A and 11B were obtained using the process parameters listed in Table 1 below:

TABLE 1

| Process Parameters | | |
|---|---|---|
| | FIG. 11A - evidence of spattering | FIG. 11B - decreased spattering |
| Laser power (W) | 2100 | 1200 |
| Velocity (mm/s) | 20 | 7 |
| Defocusing (mm) | +10 | +10 |
| Wobble pattern | figure eight | figure eight |
| Wobble frequency (Hz) | 60 | 100 |
| Wobble amplitude (mm) | 20 | 1.0 |

The results indicated that decreasing laser power and velocity in combination with lower wobble amplitudes resulted in less spatter.

Example 5—Wobble Optimization Test 2

A test was performed to see if adjusting certain process parameters would improve the shape of the fillet, including the weld face. The micrographs shown in FIGS. 12A and 12B were obtained using the process parameters listed in Table 2 below:

TABLE 1

Figure 12A:
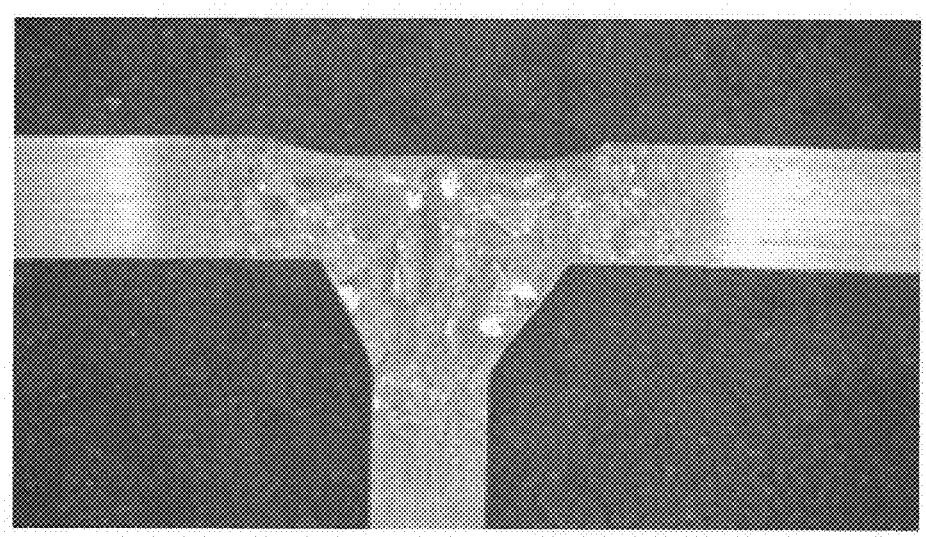
FIGS. 12A and 12B are micrographs of a cross-section of two metal substrates formed with different wobble process parameters in accordance with one or more aspects of the invention.
Figure 12B:
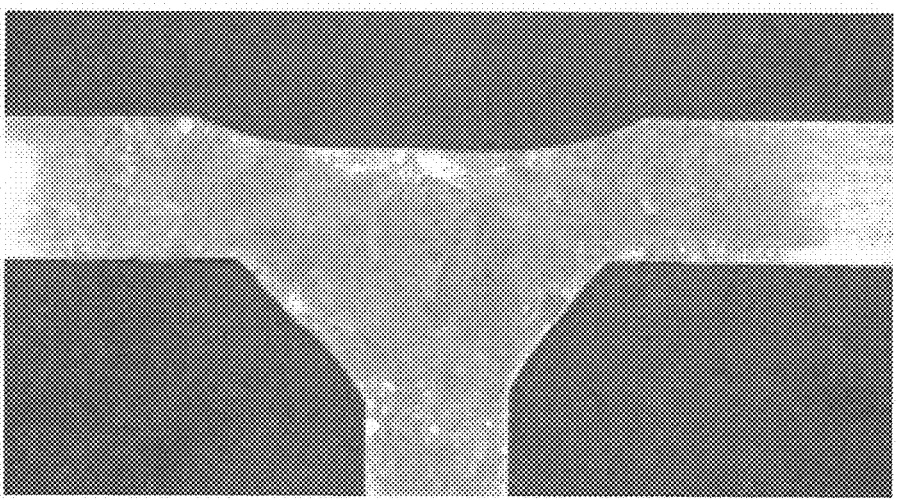

| Process Parameters | | |
|---|---|---|
| | FIG. 12A - less optimal fillet shape | FIG. 12B - improved fillet shape |
| Laser power (W) | 1200 | 1266 |
| Velocity (mm/s) | 7 | 7 |
| Defocusing (mm) | +10 | +10 |
| Wobble pattern | figure eight | figure eight |
| Wobble frequency (Hz) | 100 | 40 |
| Wobble amplitude (mm) | 1.0 | 2.3 |

The results indicated that decreasing the wobble frequency and increasing the wobble amplitude improved the shape of the fillet. For instance, the weld faces in FIG. 12A are less smooth than those in FIG. 12B.

Example 6—Wobble Optimization Test 3

Referring to FIG. 5B, different offsets (between the center point of the wobble pattern and the center line 127) for the wobble pattern were tested to see how this influenced the quality of the weld. Four different offsets were examined (0 mm, 0.3 mm, 0.5 mm, and 0.7 mm). Micrographs of the results are shown in FIGS. 13A-13D. The most "symmetrical" results were obtained with the offset being 0 mm (i.e., the center point of the pattern coincides with center line 127), with an offset of 0.3 mm (and greater) showing asymmetry in both the fillet shape and size. For instance, the weld formed with an offset of 0.7 mm did not form a fillet on one side, and an offset 0.3 mm gave the weld an irregular profile.

Example 7—I-Beam Fabrication

Figure 14A:
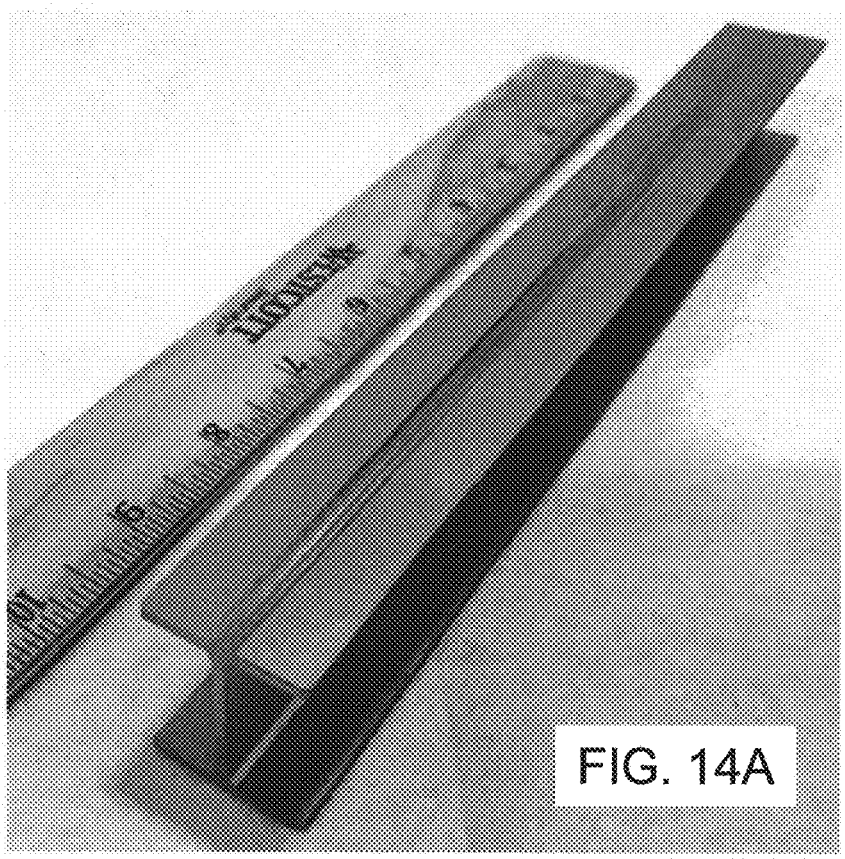
FIGS. 14A-14C are photographs of various views of three metal substrates welded according to aspects of the invention.
Figure 14B:
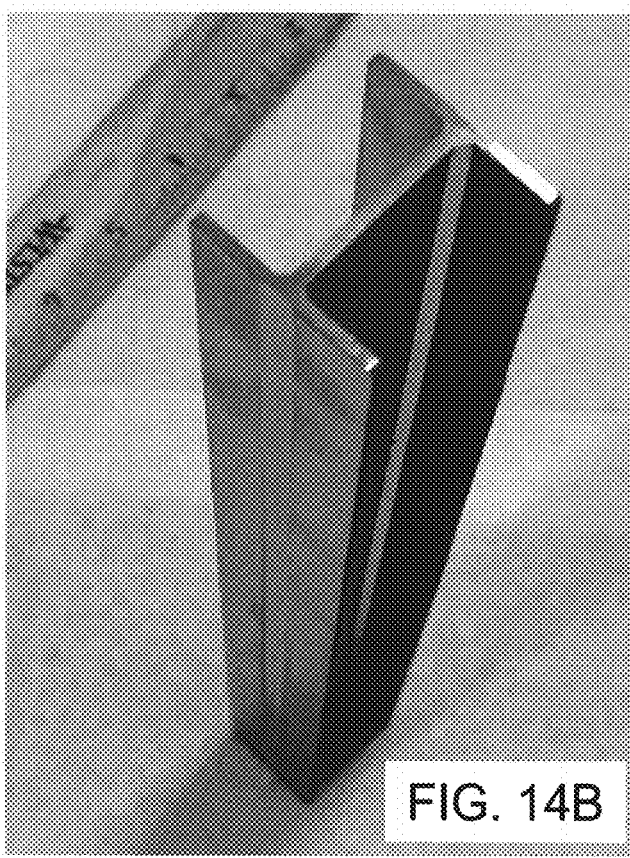
Figure 14C:
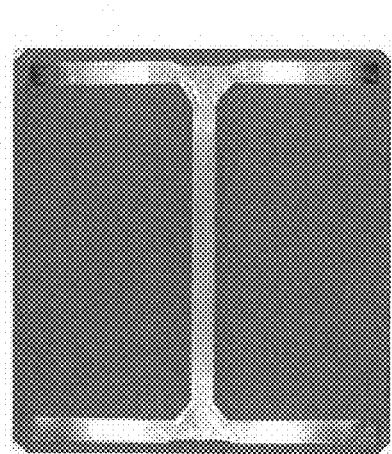

An I-beam was fabricated using the backside surface welding process described herein with three metal substrates using two separate single-pass steps for each flange of the T-joint. The laser power was 1200 W and the welding speed was 7 mm/s, with photographs of the results shown in FIGS. 14A-14C, with FIG. 14A being a top perspective view, FIG. 14B being a side perspective view, and FIG. 14C being a cross-sectional view.

Other Geometrical Configurations

Figure 15A:
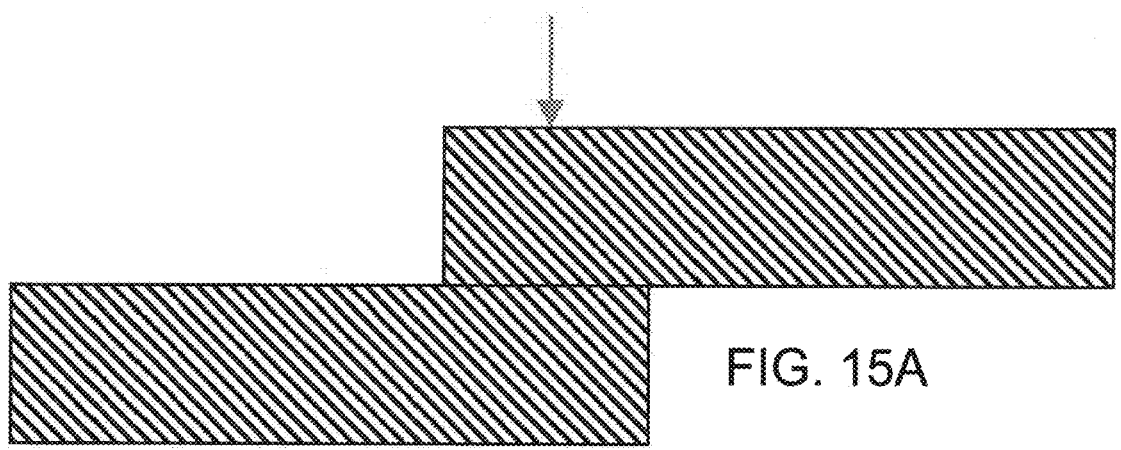
FIGS. 15A-15C are alternative configurations of metal substrates that may be welded together in accordance with aspects of the invention.
Figure 15B:
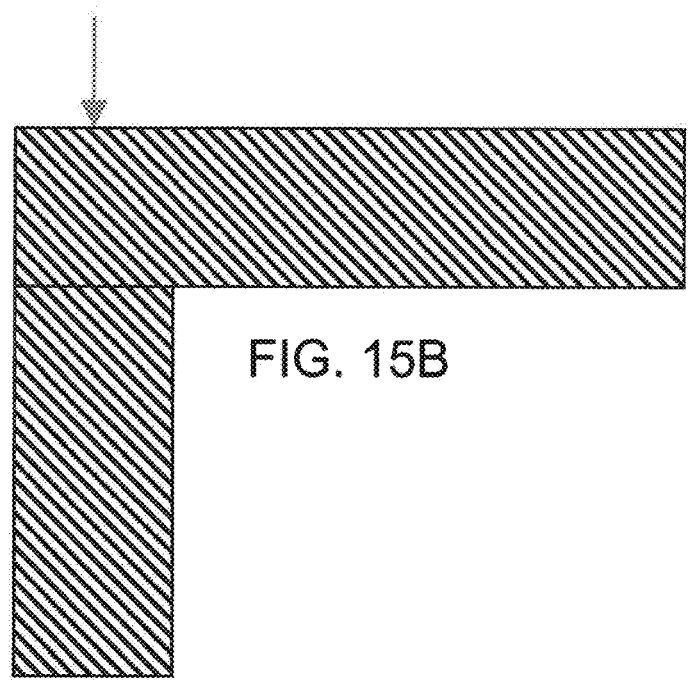
Figure 15C:
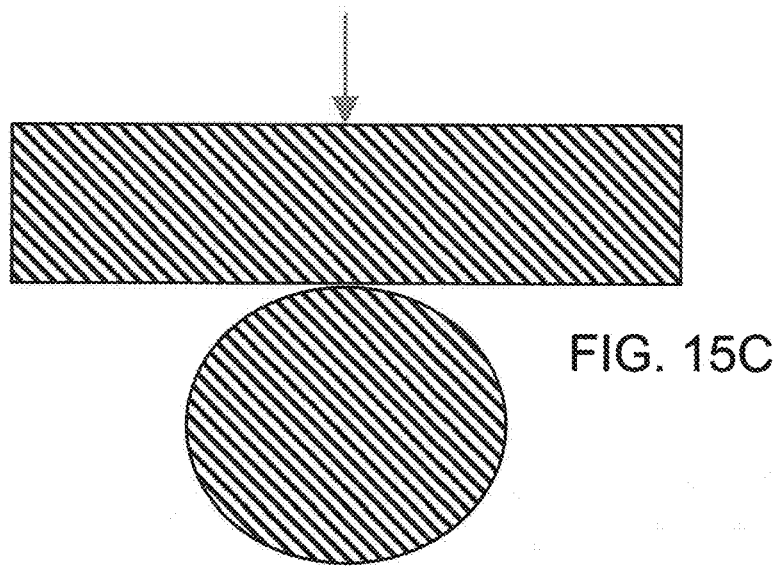
Figure 16A:
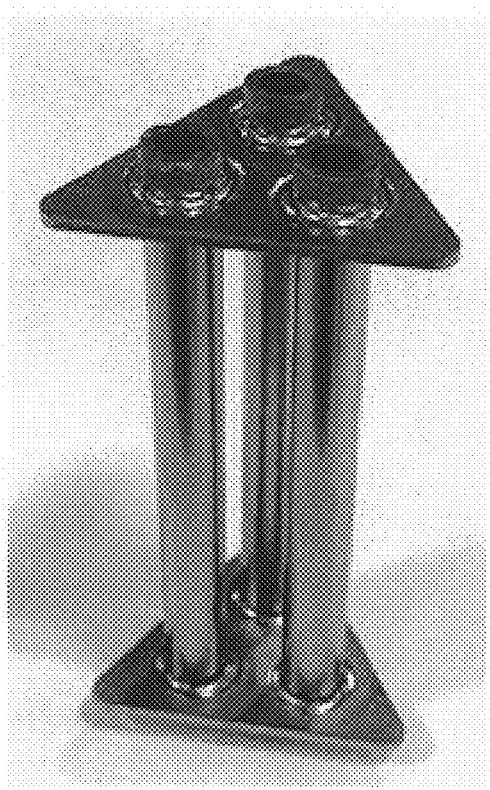
FIGS. 16A-16C are photographs of various views of metal substrates welded together to form components of a heat exchanger in accordance with aspects of the invention.
Figure 16B:
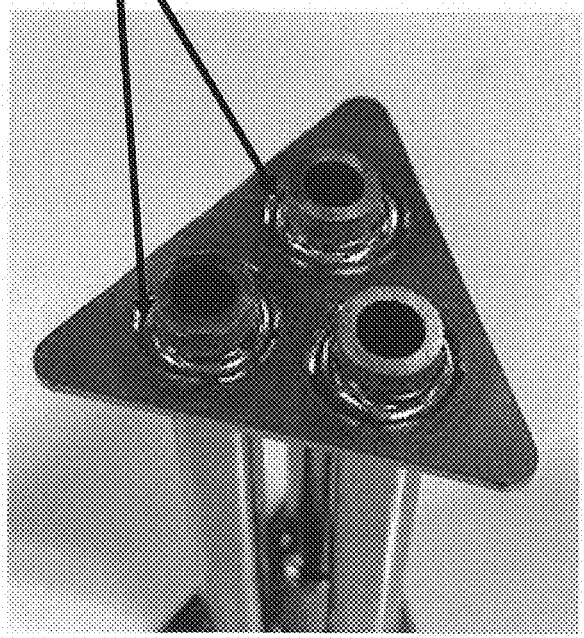
Figure 16C:
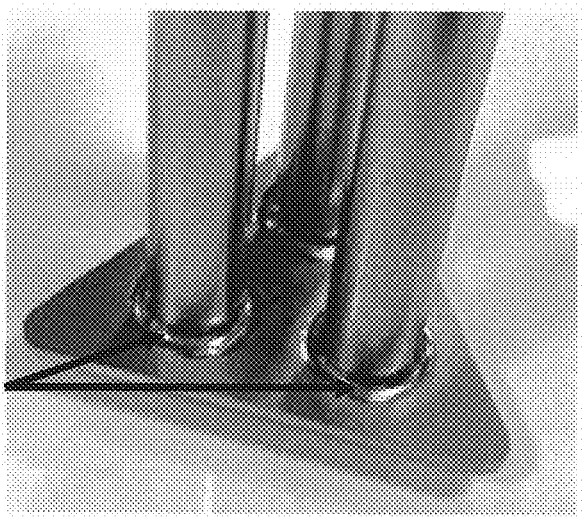

FIGS. 15A-15C illustrate three other configurations (a lap joint, a corner joint, and a flare-bevel joint, respectively) for metal substrates that may be welded together using the systems and processes described herein, with arrows indicating the backside surface that serves as the target area for the laser beam energy. In addition, besides straight or linear welds such as those shown in FIGS. 2B and 14A, circular or other types of shapes of welds are also possible with the disclosed system and method. For instance, FIGS. 16A-16C are photographs of metal tube structures welded to metal baffle structures as part of a heat exchanger. FIG. 16A is a top perspective view of the entire structure that includes two baffles that are welded to each end of three tubular structures. FIG. 16B shows a close-up view of the top portion of the structure with the undercut regions of the welds in view, and FIG. 16C shows a close-up view of the bottom portion of the structure with the weld face in view. As can be seen in the photograph, the weld face has a smooth profile.

Figure 17A:
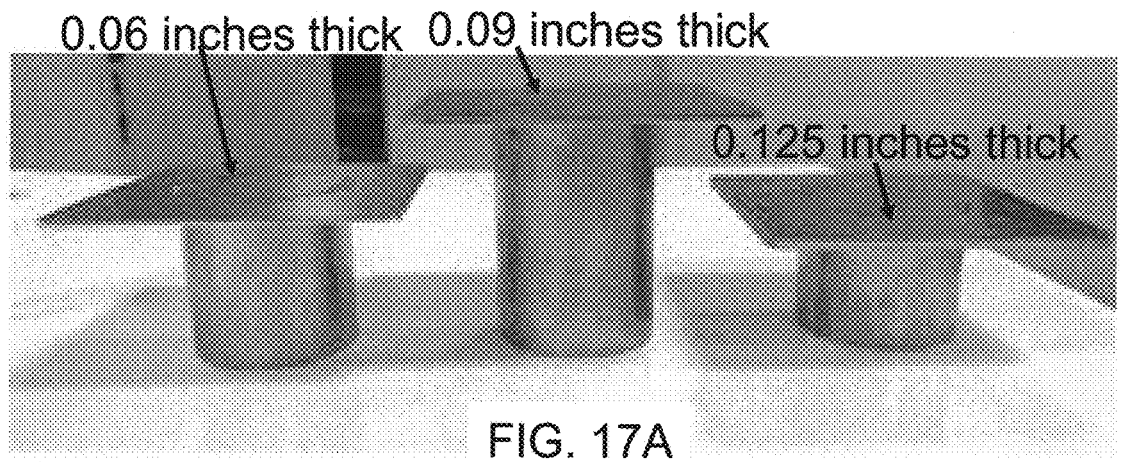
FIGS. 17A-17D are photographs of various views of metal substrates welded together according to another example in accordance with aspects of the invention.
Figure 17B:
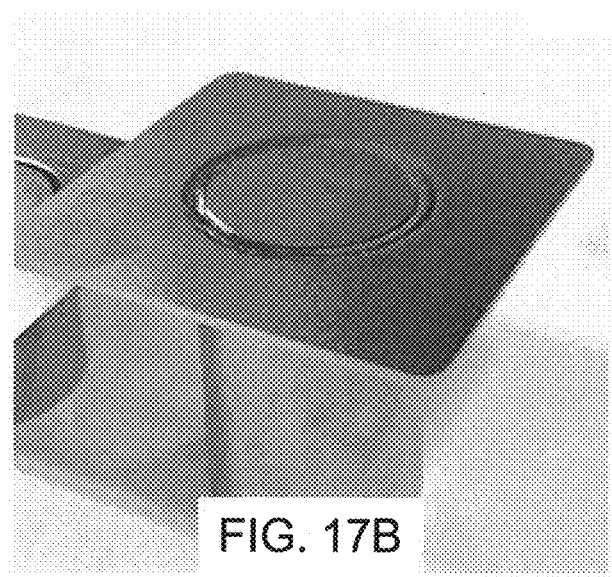
Figure 17C:
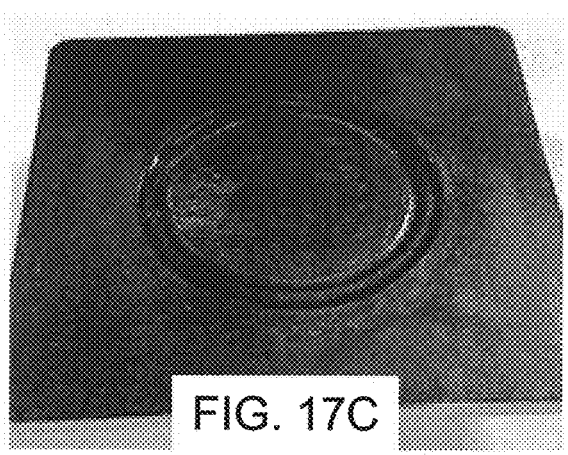
Figure 17D:
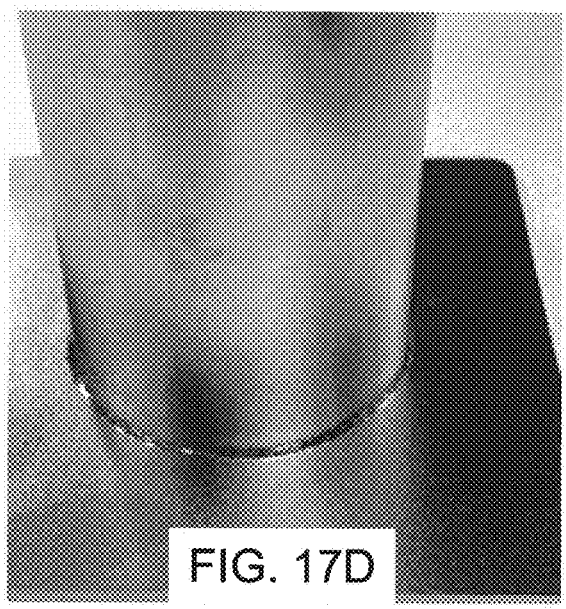

FIGS. 17A-17D are photographs of welded metal substrates showing another example of a circular weld. In this instance, a metal plate is welded to a metal tubular structure (the latter of which forms the rib) having a thickness of 0.06 inches, and three different thicknesses of the plate were tested: 0.06 inches, 0.09 inches, and 0.125 inches. FIGS. 17B and 17C show views of the undercut region of the circular weld from one of the substrates, and FIG. 17D shows a view of the weld face, which has a smooth profile. The welds for each plate thickness were of similar high quality with weld faces having a smooth profile.

In addition, the system may be configured to perform welds that are at an angle and/or are tilted (i.e., the first and second metal substrates are configured at an angle). For instance, the first and second metal substrates may be configured at a downward angle of ≤20 degrees or ≤30 degrees, and/or tilted at ≤20 degrees.

The aspects disclosed herein in accordance with the present invention, are not limited in their application to the details of construction and the arrangement of components set forth in the following description or illustrated in the accompanying drawings. These aspects are capable of assuming other embodiments and of being practiced or of being carried out in various ways. Examples of specific implementations are provided herein for illustrative purposes only and are not intended to be limiting. In particular, acts, components, elements, and features discussed in connection with any one or more embodiments are not intended to be excluded from a similar role in any other embodiments.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated reference is supplementary to that of this document; for irreconcilable inconsistencies, the term usage in this document controls.

Having thus described several aspects of at least one example, it is to be appreciated that various alterations, modifications, and improvements will readily occur to those skilled in the art. For instance, examples disclosed herein may also be used in other contexts. Such alterations, modifications, and improvements are intended to be part of this disclosure, and are intended to be within the scope of the examples discussed herein. Accordingly, the foregoing description and drawings are by way of example only.

What is claimed is:

1. A method for laser welding a first metal substrate to a second metal substrate, the first metal substrate having a first planar surface and a second planar surface disposed opposite the first planar surface, the method comprising:

selecting first and second metal substrates having a thickness, surface tension and thermal characteristics suitable for controlled flow thereof when in a molten state;
placing an end face of the second metal substrate proximate to the first planar surface;
generating an input laser beam from a fiber laser;
providing a beam delivery system configured to receive the input laser beam and to generate an output laser beam having a beam spot that moves in a predetermined pattern along a first and a second axes; and
passing the input laser beam through the beam delivery system to irradiate a target area on the second planar surface of the first metal substrate with the beam spot, the target area positioned over an intersection region of the first planar surface where the end face is positioned proximate to the first planar surface, wherein irradiating in the predetermined pattern along the first and the second axes creates a dual fillet weld such that a fillet weld having a weld face with a smooth profile is formed in each corner area between the first and second substrates in a single pass by the beam spot of the target area.

2. The method of claim 1, wherein irradiating creates a weld region that extends through a thickness of the first metal substrate and a thickness of the second metal substrate.

3. The method of claim 2, wherein a cross section of the weld region has at least one of a uniform hardness, small grain size, and low porosity.

4. The method of claim 1, wherein placing the end face of the second metal substrate proximate to the first planar surface includes a gap between the end face and the first planar surface, the gap being a distance of zero to one quarter of the thickness of the first metal substrate.

5. The method of claim 1, further comprising positioning the output laser beam to have an incident angle of up to 10 degrees from a reference line perpendicularly incident to the second planar surface.

6. A system for laser welding a first metal substrate to a second metal substrate, the first metal substrate having a first planar surface and a second planar surface disposed opposite the first planar surface, and the second metal substrate having an end face positioned proximate to the first planar surface, the system comprising:

a fiber laser energy source configured to generate an input laser beam; and
a beam delivery system configured to:
receive the input laser beam and to generate an output laser beam having a beam spot that moves in a predetermined pattern along a first and a second axes, and
irradiate a target area on the second planar surface of the first metal substrate with the beam spot, the target area positioned over an intersection region of the first planar surface where the end face is positioned proximate to the first planar surface,
wherein the fiber laser energy source and the beam delivery system are configured such that the irradiation forms a fillet weld having a weld face with a smooth profile in each corner area between the first and second metal substrates in a single pass by the beam spot of the target area.

7. The system of claim 6, further comprising a controller configured to control the beam delivery system such that the predetermined pattern is aligned with the intersection region.

8. The system of claim 6, wherein the beam delivery system is configured to generate a defocused output laser beam.

9. The system of claim 6, wherein the irradiation of the target area creates a weld region that extends through a thickness of the first metal substrate and a thickness of the second metal substrate.

10. The system of claim 9, wherein the weld region has at least one of uniform hardness, low porosity, and small grain structure.

11. The system of claim 6, wherein the beam delivery system is configured to direct the output laser beam at an incident angle of up to 10 degrees from a reference line perpendicularly incident to the second planar surface.

12. The system of claim 6, wherein the beam delivery system includes movable mirrors configured to generate the predetermined pattern along the first and second axes.

13. The system of claim 12, wherein the movable mirrors are configured to generate one of a one of a circular pattern, a linear pattern, a figure-eight pattern, and an infinity pattern as the predetermined pattern.

14. The system of claim 13, wherein the first and second metal substrates are a titanium alloy.

15. The system of claim 6, further comprising a flow of inert shielding gas directed at the target area.

16. The system of claim 6, wherein the first and second metal substrates have a thickness, surface tension and thermal characteristics suitable for controlled flow thereof when in a molten state.

* * * * *